(12) United States Patent
Rieder et al.

(10) Patent No.: US 11,846,532 B2
(45) Date of Patent: Dec. 19, 2023

(54) VIBRONIC MEASURING SYSTEM

(71) Applicant: Endress+Hauser Flowtec AG, Reinach (CH)

(72) Inventors: Alfred Rieder, Landshut (DE); Michael Kirst, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 17/758,078

(22) PCT Filed: Dec. 1, 2020

(86) PCT No.: PCT/EP2020/084119
§ 371 (c)(1),
(2) Date: Jun. 28, 2022

(87) PCT Pub. No.: WO2021/136626
PCT Pub. Date: Jul. 8, 2021

(65) Prior Publication Data
US 2023/0037109 A1    Feb. 2, 2023

(30) Foreign Application Priority Data

Dec. 30, 2019   (DE) ..................... 10 2019 009 024.1

(51) Int. Cl.
*G01F 1/84*    (2006.01)
(52) U.S. Cl.
CPC ............ *G01F 1/8409* (2013.01); *G01F 1/845* (2013.01)
(58) Field of Classification Search
CPC .. G01F 1/8413; G01F 18/8422; G01F 1/8427; G01F 1/845; G01F 1/8468; G01F 1/8472; G01F 1/8477
See application file for complete search history.

(56) References Cited

U.S. PATENT DOCUMENTS 8,316,722 B2 * 11/2012 Bitto ..................... G01F 1/8413
73/861.357
2019/0383658 A1    12/2019 Zhu et al.

FOREIGN PATENT DOCUMENTS

| CN | 204854846 U | 12/2015 |
|----|-------------|---------|
| DE | 19601349 A1 | 7/1997  |

(Continued)

*Primary Examiner* — Erika J. Villaluna
(74) *Attorney, Agent, or Firm* — Mark A. Logan; Endress+Hauser (USA) Holding, Inc.

(57) ABSTRACT

A measuring system comprises a measuring transducer of vibration-type having a tube arrangement, an exciter arrangement, a sensor arrangement, and a measuring system electronics. The measuring system electronics is adapted in a first operating mode to supply current to the oscillation exciters whereby the tube arrangement executes wanted oscillations with an oscillation frequency predetermined by the driver signals and to receive and to evaluate oscillation measurement signals representing oscillatory movements of the wanted oscillations. The measuring system electronics is further adapted in a second operating mode to supply current to the oscillation exciters that only the tube executes wanted oscillations and the tube executes no wanted oscillations while nevertheless executing mechanical oscillations coupled with the wanted oscillations of the tube and to receive and to evaluate both oscillation measurement signals representing oscillatory movements of the wanted oscillations and also oscillation measurement signals representing oscillatory movements of the coupled oscillations.

39 Claims, 5 Drawing Sheets

(56) References Cited

FOREIGN PATENT DOCUMENTS

DE 102012109729 A1 5/2014
WO 2019081170 A1 5/2019

* cited by examiner

VIBRONIC MEASURING SYSTEM

CROSS-REFERENCE TO RELATED APPLICATIONS

The present application is related to and claims the priority benefit of DPMA Patent Application No. 10 2019 009 024.1, filed on Dec. 30, 2019, and International Patent Application No. PCT/EP2020/084119, filed Dec. 1, 2020, the entire contents of which are incorporated herein by reference.

TECHNICAL FIELD

The invention relates to a vibronic measuring system formed by means of a measuring transducer of vibration-type and a measuring system electronics electrically connected therewith, especially a Coriolis-mass flow measuring device or Coriolis-mass flow/density measuring device, for measuring and/or monitoring at least one measured variable of a flowing measured substance.

BACKGROUND

Vibronic measuring systems of the field of the invention are described, for example, in US-A 2006/0266129, US-A 2007/0113678, US-A 2010/0011882, US-A 2012/0123705, US-A 2017/0356777, U.S. Pat. Nos. 6,311,136, 5,602,345, 5,926,096, WO-A 2009/136943, WO-A 2019/017891, WO-A 2019/081169, WO-A 2019/081170, WO-A 87/06691, WO-A 96/05484, WO-A 96/08697, WO-A 97/26508, WO-A 99/39164 and applicant's own international patent application PCT/EP2019/082044 not published as of the earliest filing date to which this application is entitled. Each of the above described measuring systems includes a measuring transducer having a tube arrangement for conveying the flowing fluid, an exciter arrangement for converting electrical power into mechanical power serving for exciting and maintaining forced mechanical oscillations of the tube arrangement, and a sensor arrangement for registering mechanical oscillations of the tube arrangement and for providing oscillation measurement signals representing oscillatory movements of the tube arrangement, as well as including a measuring system electronics electrically coupled with the measuring transducer, namely both with its exciter arrangement as well as also with its sensor arrangement, for operating the measuring transducer and for evaluating oscillation measurement signals delivered by the measuring transducer.

The tube arrangements shown in US-A 2012/0123705, U.S. Pat. Nos. 5,602,345, 5,926,096, WO-A 2009/136943, WO-A 87/06691, WO-A 96/05484, WO-A 96/08697, WO-A 97/26508, WO-A 99/39164 and WO-A 2019/017891 have, in each case, a first flow divider serving as a line branching, or inlet side, and having exactly two flow openings, a second flow divider embodied equally to the first flow divider, serving as a line junction, or outlet side, and having exactly two flow openings, and two tubes, namely a first tube as well as a second tube, while the tube arrangements shown in U.S. Pat. No. 5,602,345, WO-A 96/08697, US-A 2017/0356777, WO-A 2019/081169, WO-A 2019/081170 and the mentioned patent application PCT/EP2019/082044 have, in each case, a first flow divider serving as a line branching, or inlet side, and having exactly two flow openings, a second flow divider embodied equally to the first flow divider, serving as a line junction, or outlet side and having exactly two flow openings, as well as two tubes, namely a first tube as well as a second tube. Each of the tubes of the tube arrangements extends with a tube length, in each case, from a first end of the tube to a second end of the tube and has, in each case, a lumen surrounded by a metal tube wall, and extending, in each case, from the first end of the tube to the second end of the tube. Additionally, each of the tubes is connected, in each case, to each of the first and second flow dividers, in such a manner that the first tube communicates with its first end with a first flow opening of the first flow divider and with its second end with a first flow opening of the second flow divider, the second tube communicates with its first end with a second flow opening of the first flow divider and with its second end with a second flow opening of the second flow divider, or that the first tube communicates with its first end with a first flow opening of the first flow divider and with its second end with a first flow opening of the second flow divider, the second tube communicates with its first end with a second flow opening of the first flow divider and with its second end with a second flow opening of the second flow divider, the third tube communicates with its first end with a third flow opening of the first flow divider and with its second end with a third flow opening of the second flow divider and the fourth tube communicates with its first end with a fourth flow opening of the first flow divider and with its second end with a fourth flow opening of the second flow divider. Moreover, each of the tubes of each of the tube arrangements is, in each case, also adapted to be flowed through by measured substance and during that to be caused to vibrate.

In the case of the measuring systems shown in U.S. Pat. No. 5,602,345, WO-A 2009/136943, WO-A 96/08697, WO-A 97/26508, WO-A 99/39164 or WO-A 2019/017891, each of the exciter arrangements has, additionally, in each case, two electrodynamic oscillation exciters, of which a first oscillation exciter is connected mechanically with the first tube as well as electrically with the measuring system electronics and a second oscillation exciter is connected mechanically with the second tube as well as electrically with the measuring system electronics. Each of the first and second oscillation exciters is, additionally, in each case, adapted to convert electrical power into mechanical power serving for exciting oscillations of the tubes, and, thus, to apply time variable driving forces to the tubes at points of engagement formed therewith by means of the oscillation exciters.

The measuring system electronics of the measuring systems is, in turn, also adapted to supply electrical current to the oscillation exciters, namely to generate electrical driver signals and to supply such to the oscillation exciters, in such a manner that the first and second tubes, or the first, second, third and fourth tubes, execute, at least partially, wanted oscillations, namely forced mechanical oscillations having at least one or more wanted frequencies, namely oscillation frequencies predetermined by the driver signals, for example, also corresponding to one or more resonance frequencies of the tube arrangement, wherein the wanted oscillations are, among others things, also suitable to bring about in the measured substance flowing through the tubes, in each case, Coriolis forces dependent on mass flow. For registering oscillations of the tube arrangement, the sensor arrangement includes four mutually spaced, for example, electrodynamic, oscillation sensors, of which a first oscillation sensor and a second oscillation sensor are connected mechanically with the first tube, or with the first and third tubes, and a third oscillation sensor and a fourth oscillation sensor are connected mechanically with the second tube, or with the second and fourth tubes. Each of the oscillation sensors is, additionally, in each case, adapted to register oscillatory movements of the first, second, third, or fourth tubes mechanically connected therewith and to provide first, second, third, and fourth oscillation measurement signals representing the oscillatory movements and to transmit such to the measuring system electronics.

Additionally, each of the above described measuring systems also comprises, embodied as a transducer-protective housing, a support structure, which is secured to the flow dividers of the tube arrangement. In the case of WO-A 96/08697 or WO-A 2019/017891, the support structure and the tube arrangement are connected releasably together, for example, in order to enable replacement of a defective or worn tube arrangement with an intact tube arrangement on-site.

As discussed, among others, in the above referenced US-A 2012/0123705, US-A 2006/0266129, and WO-A 99/39164, vibration-type measuring transducers and, consequently, measuring systems formed therewith, can, during their overall many years of service, be exposed to a multitude of different kinds of loadings, which can bring about significant deviations of the measuring system from an earlier reference state ascertained, for instance, in the case of calibration in the plant and/or at a start-up of the measuring system, and which can, associated therewith, significantly reduce the measuring system accuracy, with which the parameters to be registered for the medium are ultimately mapped into the corresponding measured values. As examples of such loadings, which, as a result, on the whole, irreversibly change an oscillatory behavior of the at least one measuring tube, be it once or multiply recurring, or steadily occurring, or only for a short time, there can be mentioned, by way of example, excess temperatures, high temperature shock or other thermally related overloadings of the at least one measuring tube, high pressure surges in the medium, excessive clamping forces and/or shaking forces exerted on the measuring transducer from the process line and, associated therewith, crack formation and/or plastic deformation in the at least one measuring tube, erosion of the interior of the at least one measuring tube, consequently a reduction of its wall thickness by the medium conveyed in the measuring transducer, for example, as a result of corrosion and/or abrasion, the forming of accretion on the medium-contacting inside of the at least one measuring tube, and material fatigue or other wear phenomena of the at least one measuring tube. Moreover, during the lifetime of the measuring system, also the at least one oscillation exciter, as well as also each of the oscillation sensors can, for instance, due to thermally related overloading, or aging, undergo changes relevant for the accuracy of measurement, for instance, in such a manner that, as a result, also an electrical impedance of the measuring transducer is changed. As a result of such loadings, ultimately a transfer function of the measuring transducer, according to which the measuring transducer operated by the at least one driver signal lastly converts a desired parameter of the medium into a corresponding oscillation signal, changes, in a, firstly, not directly detectable- or predictable, however, at times, as regards the desired high accuracy of measurement, no longer to be neglected manner, such that the measuring system begins not to work as desired. Additionally, as a result of such overloadings influencing particularly even the total structural integrity of the measuring transducer, degrading of the ability of the measuring system to function or, in given cases, even leakage or explosion potential must be cared for. Such changes from the reference state, relevant also for the operational safety of measuring systems of the type being discussed, can, particularly in the case of toxic and/or easily inflammable media, or in the case of gases under high pressure, have also quite catastrophic consequences for the entire process plant as well as for persons in the plant. Taking this into consideration, measuring systems of the type being discussed are usually recurringly correspondingly checked, for instance, in the course of measures connected with predictive maintenance, and, when required, for instance, in the case of diagnosed decreased measurement accuracy, at times, correspondingly recalibrated or replaced.

For the purpose of an as early as possible detecting of a deviation of the measuring system exceeding a predetermined measure of tolerance from a reference state earlier ascertained therefor, or, for instance, in the case of a subsequently installed, or, such as proposed in, among others, WO-A 2019/017891, on-site installed, tube arrangement, a reference state predetermined therefor, consequently a diagnosis of measuring transducer related failures of the measuring system, and associated therewith, impending significant lessening of the accuracy of measurement, or the operational safety of measuring systems of the type being discussed, it is proposed, for example in US-A 2012/0123705, the 20-A 2010/0011882, US-A 2007/0113678, WO-A 96/05484, WO-A 99/39164, and U.S. Pat. No. 5,926,096, to detect aforementioned changes of such measuring systems based on comparing current (namely ascertained during operation) oscillation responses of selected components of the measuring transducer, or system parameters representing the oscillation responses, for example, a measuring tube stiffness, a number of, in given cases, also frequency selectively registered, damping factors, ratios of mechanical eigen, or resonance, frequencies of the at least one measuring tube or other system parameters etc. describing predetermined measuring transducer transfer functions and, consequently, characterizing the measuring system response, to selected—broadband, or frequency selective—oscillation excitations, such as, for instance, an impact or a continuous, in given cases, also multi-modal, oscillation excitement of one or more of the eigenfrequencies of the tubes, with measuring transducer transfer functions (system functions of the measuring transducer), or reference system parameters representing such, suitably ascertained therefor earlier in the reference state of the measuring system, in order, for example, upon exceeding a correspondingly predetermined threshold value representing a still acceptable measure of tolerance, consequently upon diagnosis of a failure or impending failure, to generate a system status-, or disturbance report, for example, an alarm, correspondingly signaling such.

SUMMARY

An object of the invention is, consequently, so to improve vibronic measuring systems of the aforementioned type that therewith—particularly, however, also with the already conventional, consequently established, oscillation exciters and sensors "on-board" in measuring systems of the type being discussed and as well as also as much as possible without having to mentionably influence or interrupt the actual measuring operation—the occurrence of possible disturbances of the measuring system (such as, for instance, wear, or aging phenomena of a measuring transducer reducing the accuracy of measurement and/or the operational safety of the measuring system) can be detected as early as possible and reliably, in given cases, also be signaled; this, especially, also largely independently of the medium flowing in the measuring transducer as well as under significant, in given cases, also exclusive application of the design proven for such measuring systems, not least by all also for the measuring transducers to be installed therein, as well as also under equally significant maintaining of proven technologies and architectures of already established measuring system electronics.

For achieving the object, the invention resides in a vibronic measuring system, especially a Coriolis-mass flow measuring device or a Coriolis-mass flow-/density measuring device, for measuring and/or monitoring at least one, especially time variable, flow parameter, especially mass flow, volume flow and/or flow velocity, and/or for measuring and/or monitoring at least one, especially time variable, substance parameter, especially density and/or viscosity, of a flowing measured substance, especially a gas, a liquid or a dispersion, especially a vibronic measuring system as claimed in claim 1.

The measuring system, for example, a measuring system embodied as an in line measuring device and/or as a measuring device in compact construction, comprises:

a measuring transducer with a tube arrangement for conveying a flowing measured substance and having an exciter arrangement for converting electrical power into mechanical power serving for exciting and maintaining forced mechanical oscillations of the tube arrangement and having a sensor arrangement for registering mechanical oscillations of the tube arrangement and for providing oscillation measurement signals representing oscillatory movements of the tube arrangement, as well as a measuring system electronics electrically coupled with the measuring transducer, namely both with its exciter arrangement as well as also with its sensor arrangement, for example, by means of electrical connection lines, and formed, for example, by means of at least one microprocessor and/or arranged in an electronics-protective housing, for operating the measuring transducer and for evaluating oscillation measurement signals delivered from the measuring transducer. The tube arrangement includes a first flow divider with at least two flow openings, for example, a first flow divider serving as a line branching and/or inlet side, first flow divider, a second flow divider with at least two flow openings, for example, a second flow divider embodied equally to the first flow divider and/or serving as a line junction and/or outlet side, second flow divider, as well as a first tube, for example, one at least sectionally bent and/or at least sectionally straight, and a second tube, for example, one at least sectionally bent and/or at least sectionally straight and/or constructed equally to the first tube and/or at least sectionally parallel to the first tube. Each of the first and second tubes of the tube arrangement extends, in each case, from a first end of the tube to a second end of the tube with a tube length and has, in each case, a lumen surrounded by a tube wall, for example, a metal tube wall, and extending, in each case, from the first end of the tube to the second end of the tube, wherein each of the first and second tubes of the tube arrangement is connected, in each case, to each of the first and second flow dividers, in such a manner that the first tube communicates with its first end with a first flow opening of the first flow divider and with its second end with a first flow opening of the second flow divider and the second tube communicates with its first end with a second flow opening of the first flow divider and with its second end with a second flow opening of the second flow divider, and wherein each of the first and second tubes of the tube arrangement is, in each case, adapted to be flowed through by measured substance and during that to be caused to vibrate. The first and second tubes of the tube arrangement are mechanically coupled with one another at least via the first and second flow dividers in such a manner that forced mechanical oscillations of the first tube bring about coupled mechanical oscillations of the second tube and forced mechanical oscillations of the second tube bring about coupled mechanical oscillations of the first tube. The exciter arrangement includes two oscillation exciters, for example, electrodynamic and/or equally constructed oscillation exciters, of which a first oscillation exciter is mechanically connected with the first tube, for example, positioned at the halfway point of the first tube, and a second oscillation exciter is mechanically connected with the second tube, for example, positioned at the halfway point of the second tube. Each of the oscillation exciters is, in each case, adapted to convert electrical power of a time variable electrical current into mechanical power, especially in such a manner that at points of engagement formed by means of the oscillation exciters with the mechanically connected tubes, time variable driving forces act on the first and second tubes. The sensor arrangement includes at least four oscillation sensors, for example, electrodynamic oscillation sensors and/or equally constructed oscillation sensors and/or mutually spaced oscillation sensors, of which a first oscillation sensor and a second oscillation sensor are mutually spaced, for example, positioned symmetrically to the first oscillation exciter on the first tube, and, for example, at least partially, connected mechanically with the first tube, and a third oscillation sensor and a fourth oscillation sensor are mutually spaced, for example, positioned symmetrically to the second oscillation exciter on the second tube, and, for example, at least partially, connected mechanically with the second tube. Each of the first and second oscillation sensors is, in each case, adapted to register oscillatory movements of the first tube and to convert such into, for example, electrical or optical, first, and second, oscillation measurement signals representing the oscillatory movements, for example, in such a manner that each of the first and second oscillation measurement signals, in each case, contains one or more sinusoidal signal components with, in each case, a frequency corresponding to an oscillation frequency of oscillatory movements of the first tube, and each of the third and fourth oscillation sensors is, in each case, adapted to register oscillatory movements of the second tube and to convert such into, for example, electrical or optical, third, and fourth, oscillation measurement signals representing the oscillatory movements, for example, in such a manner that each of the third and fourth oscillation measurement signals, in each case, contains one or more sinusoidal signal components with, in each case, a frequency corresponding to an oscillation frequency of oscillatory movements of the second tube.

The measuring system electronics is, in turn, adapted to supply electrical current to the first oscillation exciter, namely to supply an electrical, first driver signal to the first oscillation exciter, whereby the first tube executes forced mechanical oscillations, for example, bending oscillations, with one or more oscillation frequencies predetermined by the first driver signal and the second tube executes mechanical oscillations coupled with at least one of the oscillations of the first tube, as well as to supply electrical current to the second oscillation exciter, namely to supply an electrical, second driver signal to the second oscillation exciter, whereby the second tube executes forced mechanical oscillations, for example, bending oscillations, with one or more oscillation frequencies predetermined by the second driver signal and the first tube executes mechanical oscillations coupled with oscillations of the second tube.

In the case of the measuring system of the invention, the measuring system electronics is, furthermore, adapted: In a first operating mode to produce both the first driver signal with a first wanted electrical current, namely an as regards an electrical current level dominating or single, sinusoidal electrical current component having an (alternating electrical current) frequency and to supply such to the first oscillation exciter, as well as also to produce the second driver signal with at least a second wanted electrical current, namely an as regards an electrical current level dominating or single sinusoidal electrical current component having an (alternating electrical current) frequency and to supply such to the second oscillation exciter, in such a manner that the first tube executes at least partially, for example, predominantly, first wanted oscillations, namely mechanical oscillations forced by the (electrical current supplied) first oscillation exciter and having at least a first wanted frequency, namely an oscillation frequency corresponding to the (alternating electrical current) frequency of the first wanted electrical current and the second tube executes at least partially, for example, predominantly, second wanted oscillations, namely mechanical oscillations forced by the (electrical current supplied) second oscillation exciter and having at least a second wanted frequency, namely an oscillation frequency corresponding to the (alternating electrical current) frequency of the second wanted electrical current, for example, in such a manner that the first wanted oscillations and/or second wanted oscillations are suitable to bring about in the flowing measured substance Coriolis forces dependent on mass flow, and each of the first and second oscillation signals has first and second wanted-signal components, respectively, namely sinusoidal signal components with frequency corresponding to the first wanted frequency and each of the third and fourth oscillation signals has third and fourth wanted-signal components, respectively, namely sinusoidal signal components with frequency corresponding to the second wanted frequency.

Moreover, the measuring system electronics is, especially, also adapted in a second operating mode, for example, a second operating mode activated before and/or after the first operating mode, at least temporarily, to produce the first driver signal with the first wanted-wanted electrical current and to supply such to the first oscillation exciter, for example, to supply electrical current to the first oscillation exciter as in the first operating mode, and, at the same time, to supply no driver signal containing the second wanted-electrical current component to the second oscillation exciter, in such a manner that the first tube executes, at least partially, first wanted oscillations and the second tube executes mechanical oscillations coupled with the first wanted oscillations and having the first wanted frequency, equally as well, no second wanted oscillations, and that each of the first and second oscillation signals has, in each case, the wanted-signal component and each of the third and fourth oscillation signals has, in each case, a coupling-signal component, namely a particular sinusoidal signal component having frequency corresponding to the (alternating electrical current) frequency of the first wanted electrical current.

In the case of the measuring system of the invention, the measuring system electronics is additionally adapted, in the first operating mode, to receive and to evaluate the first, second, third and fourth oscillation signals, namely based on the oscillation signals, for example, at least based, in each case, on one of the wanted-signal components, to ascertain measured values quantifying the at least one physical, measured variable (sequentially in time), as well as, in the second operating mode, to receive and to evaluate at least the third oscillatory signal and/or the fourth oscillatory signal, for example, both the third oscillatory signal as well as also the fourth oscillatory signal, for example, to receive and to evaluate the first, second, third and fourth oscillation signals.

Furthermore, the invention also resides in using the above-mentioned measuring system for measuring at least one flow parameter, for example, a mass flow and/or a volume flow, and/or at least one substance parameter, for example, a density and/or a viscosity, of a fluid measured substance, especially one flowing in a pipeline, especially a gas, a liquid or a dispersion.

In a first embodiment of the invention, it is, furthermore, provided that the measuring system electronics is adapted in the second operating mode also to receive and to evaluate the first oscillatory signal and/or the second oscillatory signal.

In a second embodiment of the invention, it is, furthermore, provided that the measuring system electronics is adapted, based on at least one of the third and fourth oscillation signals received in the second operating mode, for example, each of the third and fourth oscillation signals, to ascertain measured values quantifying the at least one physical, measured variable (sequentially in time), for example, also to compare such measured values with measured values ascertained for the measured variable based on oscillation signals received in the first operating mode.

In a third embodiment of the invention, it is, furthermore, provided that the measuring system electronics is adapted to win or ascertain one or more wanted-signal components both from at least one of the first and second oscillation signals, for example, from each of the first and second oscillation signals, received in the first operating mode, for example, received both in the first operating mode as well as also in the second operating mode, as well as also to win or ascertain one or more wanted signal components from at least one of the third and fourth oscillation signals, for example, from each of the third and fourth oscillation signals, received in the first operating mode.

In a fourth embodiment of the invention, it is, furthermore, provided that each of the wanted signal components of the first, second, third and fourth oscillation signals has a phase angle dependent on mass flow of the measured substance. Developing this embodiment of the invention further, it is, additionally, provided that the measuring system electronics is adapted to ascertain, for example, to calculate, mass flow-measured values, namely measured values representing the mass flow of the flowing measured substance at least in the first operating mode based on a first phase difference, namely a difference between the phase angle of the wanted signal component of the first oscillation signal and the phase angle of the wanted component of the second oscillation signal as well as based on a second phase difference, namely a difference between the phase angle of the wanted signal component of the third oscillation signal and the phase angle of the wanted signal component of the fourth oscillation signal.

In a fifth embodiment of the invention, it is, furthermore, provided that the measuring system electronics is adapted to win or ascertain one or more coupling signal components from at least one of the third and fourth oscillation signals, for example, from each of the third and fourth oscillation signals, received in the second operating mode.

In a sixth embodiment of the invention, it is, furthermore, provided that each of the coupling signal components of the third and fourth oscillation signals has a phase angle dependent on mass flow of the measured substance.

In a seventh embodiment of the invention, it is, furthermore, provided that each of the wanted signal components of the first, second, third and fourth oscillation signals has a phase angle dependent on mass flow of the measured substance and each of the coupling signal components of the third and fourth oscillation signals has a phase angle dependent on mass flow of the measured substance, and the measuring system electronics is adapted to ascertain, for example, to calculate, at least in the first operating mode, mass flow-measured values, namely measured values representing the mass flow of the flowing measured substance, based on a first phase difference, namely a difference between the phase angle of the wanted signal component of the first oscillation signal and the phase angle of the wanted component of the second oscillation signal as well as based on a second phase difference, namely a difference between the phase angle of the wanted signal component of the third oscillation signal and the phase angle of the wanted signal component of the fourth oscillation signal, and at least in the second operating mode to ascertain, for example, to calculate, mass flow-measured values based on the first phase difference as well as based on a third phase difference, namely a difference between the phase angle of the coupling signal component of the third oscillation signal and the phase angle of the coupling signal component of the fourth oscillation signal, and/or to compare mass flow-measured values ascertained based on the first and second phase differences. Developing this embodiment of the invention further, it is, additionally, provided that the measuring system electronics is adapted to compare the first phase difference and the third phase difference with one another, and in the case of a too large difference, namely a deviation exceeding a predetermined reference value, to output a report, for example, a (disturbance) alarm.

In an eighth embodiment of the invention, it is, furthermore, provided that the measuring system electronics is adapted based on at least one of the third and fourth oscillation signals, for example, their coupling signal components, received in the second operating mode to detect, whether a disturbance of the measuring system is present, for example, a disturbance lessening an ability of the measuring system to function and/or bringing about a malfunctioning of the measuring system and/or reducing an integrity of at least one of the first, second, third and fourth oscillation measurement signals, or measured values won therefrom and/or provoking measurement errors of measured values won therefrom, for example, a disturbance due to a deposit on an inside of the tube wall of one or more of the tubes and/or due to a reduced thickness of the tube wall of one or more of the tubes and/or due to an aging of one or more of the oscillation sensors and/or oscillation exciters, for example, detection by means of a comparison of measured values for the at least one measured variable ascertained based on oscillation signals received in the first operating mode with measured values for the measured variable ascertained based on oscillation signals received in the second operating mode. Developing this embodiment of the invention further, it is, additionally, provided that the disturbance of the measuring system comprises a, for example, irreversible, change of one or more oscillation characteristics of the tube arrangement, for example, due to a reduced thickness of the tube wall of one or more of the tubes and/or due to a plastic deformation of one or more of the tubes and/or due to a deposit on an inside of the tube wall of one or more of the tubes and/or due to a crack in the tube wall of one or more of the tubes, and/or that the disturbance of the measuring system comprises a, for example, irreversible, change of one or more flow characteristics of the tube arrangement, for example, due to a reduced flow cross section of the tube arrangement, for example, as a result of a plugging of one or more of the tubes and/or as a result of a deposit on an inside of the tube wall of one or more of the tubes, and/or that the disturbance of the measuring system comprises a, for example, irreversible, change of one or more electromechanical transducer characteristics, for example, due to an aging of one or more of the oscillation sensors and/or oscillation exciters and/or due to a change of a mechanical connection between one or more oscillation sensors, or one or more oscillation exciters and their tube or tubes, and/or that the disturbance of the measuring system comprises a, for example, irreversible, change of a (scale) zero-point of the measuring system, which corresponds to a first and/or second phase difference measured at resting measured substance, and/or a (measuring) sensitivity of the measuring system.

In a ninth embodiment of the invention, it is, furthermore, provided that the measuring system electronics is adapted, based on one or more of the oscillation measurement signals received in the second operating mode to calculate one or more values of at least one measuring system-characterizing number, which characterizes an operating state, for example, a system function (transfer function) inherent in the measuring system and determining one or more functional dependencies of one or more of the oscillation measurement signals on one or more of the driver signals, and determining an ability of the measuring system to function, for example, in such a manner that the measuring system-characterizing number is dependent on one or more parameters of a system function of the measuring system mediating between the first wanted electrical current of the first driver signal and the coupling signal component of the third and/or fourth oscillation measurement signal. Developing this embodiment of the invention further, it is, additionally, provided that the measuring system-characterizing number is dependent on a system-amplitude ratio between the first wanted electrical current of the first driver signal and the coupling signal component of at least one of the third and fourth oscillation measurement signals, for example, a sum of the coupling signal components of the third and fourth oscillation measurement signals, for example, the measuring system-characterizing number quantifies the system-amplitude ratio, and/or that the measuring system-characterizing number is dependent on a system-phase difference between the wanted signal component of at least one of the first and second oscillation measurement signals, for example, a sum of the wanted signal components of the first and second oscillation measurement signals, and the coupling signal component of at least one of the third and fourth oscillation measurement signals, for example, a sum of the coupling signal components of the third and fourth oscillation measurement signals, for example, the measuring system-characterizing number quantifies the system-phase difference, and/or it is provided that the measuring system electronics is adapted to compare one or more values for the measuring system characterizing number, in each case, with one or more reference values for the measuring system characterizing number, for example, one or more reference values ascertained by the manufacturer of the measuring system and/or during manufacture and/or at start-up of the measuring system, for example, one or more reference values representing a lessening of the ability of the measuring transducer to function and/or one or more reference values representing a malfunctioning of the measuring transducer and/or one or more reference values representing a defective measuring transducer, for example, to evaluate and/or to quantify a deviation of one or more of the characterizing number values from one or more of the reference values. Additionally, the measuring system electronics can, furthermore, be adapted to ascertain, whether one or more values for the measuring system characterizing number is greater than the at least one reference value for the measuring system characterizing number, for example, in case one or more values for the measuring system characterizing number is greater than one or more reference values representing a lessened ability of the measuring transducer to function and/or greater than one or more reference values representing a malfunctioning of the measuring transducer and/or greater than one or more reference values representing a no longer intact measuring transducer, to output a report signaling such, for example, in the form of a (disturbance) alarm.

In a tenth embodiment of the invention, it is, furthermore, provided that the measuring system electronics includes a non-volatile electronic data memory (EEPROM), which is adapted to store digital data, for example, also without an applied operating voltage, for example, digital data in the form of one or more earlier ascertained reference values for the measuring system characterizing number.

In an eleventh embodiment of the invention, it is, furthermore, provided that the measuring system electronics is adapted to provide the first wanted-electrical current component of the first driver signal with an (alternating electrical current) frequency, which differs from a resonant frequency of the first tube by less than 1% of such resonant frequency and/or by less than 1 Hz.

In a twelfth embodiment of the invention, it is, furthermore, provided that the measuring system electronics is adapted to provide the second wanted-electrical current component of the second driver signal with an (alternating electrical current) frequency, which differs from a resonant frequency, fr2, of the second tube by less than 1% of such resonant frequency, fr2, and/or by less than 1 Hz.

In a thirteenth embodiment of the invention, it is, furthermore, provided that the measuring system electronics is adapted to provide the wanted-electrical current component of the first driver signal with an (alternating electrical current) frequency, which differs from a resonant frequency, fr2, of the second tube by less than 1% of such resonant frequency, fr2, and/or by less than 1 Hz.

In a fourteenth embodiment of the invention, it is, furthermore, provided that the measuring system electronics is adapted to provide the second wanted-electrical current component of the second driver signal with an (alternating electrical current) frequency, which differs from a resonant frequency, fr1, of the first tube by less than 1% of such resonant frequency, fr1, and/or by less than 1 Hz.

In a fifteenth embodiment of the invention, it is, furthermore, provided that the first and second tubes have at least one common resonant frequency, fr12, and wherein the measuring system electronics is adapted to provide the first and second wanted-electrical current components of the first and second driver signals, in each case, with an (alternating electrical current) frequency, which differs from the common resonant frequency, fr12, of the first and second tubes by less than 1% of such resonant frequency, fr12, and/or by less than 1 Hz.

In a sixteenth embodiment of the invention, it is, furthermore, provided that the tube arrangement has a first coupling element mechanically connected with each of the tubes, for example, a first coupling element positioned farther removed from the second flow divider than from the first flow divider, for example, a plate shaped first coupling element, as well as a second coupling element mechanically connected with each of the tubes, for example, a second coupling element positioned farther removed from the first flow divider than from the second flow divider, for example, a plate shaped second coupling element and/or a second coupling element constructed equally to the first coupling element.

In a seventeenth embodiment of the invention, it is, furthermore, provided that the measuring transducer has a natural bending oscillation mode, for example, a bending oscillation, fundamental mode, in the case of which the first and second tubes can execute, or execute, opposite phase, mechanical oscillations, and wherein the measuring system electronics is adapted in the first operating mode to supply to the first and second oscillation exciters first and second driver signals forcing the opposite phase, mechanical oscillations, for example, to supply the first and second wanted electrical currents with an (alternating electrical current) frequency, which differs from a resonant frequency, fr12, of the bending oscillation mode by less than 1% of the resonant frequency and/or by less than 1 Hz.

In an eighteenth embodiment of the invention, it is, furthermore, provided that the measuring system electronics is adapted in a third operating mode, for example, a third operating mode activated following the second operating mode: at least temporarily to produce the second driver signal with the second wanted electrical current and to supply such to the second oscillation exciter, for example, to supply electrical current to the second oscillation exciter in the same way as in the first operating mode, and at the same time to supply no driver signal containing the first wanted-electrical current component to the first oscillation exciter, in such a manner that the second tube executes, at least partially, second wanted oscillations and the first tube executes mechanical oscillations coupled with the second wanted oscillations and having the second wanted frequency, while, equally as well, executing no first wanted oscillations, and that each of the third and fourth oscillation signals has, in each case, the wanted signal component and each of the first and second oscillation signals, in each case, has a coupling signal component, namely a sinusoidal signal component having a frequency corresponding to the (alternating electrical current) frequency of the second wanted electrical current and the measuring system electronics is adapted in the third operating mode to receive and to evaluate at least the first oscillatory signal and/or the second oscillatory signal, for example, both the first oscillatory signal as well as also the second oscillatory signal, for example, to receive and to evaluate the first, second, third and fourth oscillation signals.

In a first additional development of the invention, both the first flow divider as well as also the second flow divider include, in each case, for example, exactly, four flow openings, and the tube arrangement includes a third tube, for example, a third tube at least sectionally bent and/or at least sectionally straight and/or at least sectionally parallel to the first tube, and a fourth tube, for example, a fourth tube at least sectionally bent and/or at least sectionally straight and/or constructed equally to the third tube and/or at least sectionally parallel to the third tube, wherein each of the third and fourth tubes of the tube arrangement extends, in each case, from a first end of the tube to a second end of the tube with a tube length and, in each case, includes a lumen surrounded by a tube wall, for example, a tube wall of metal, and extending, in each case, from the first end of the tube to the second end of the tube, and wherein each of the third and fourth tubes of the tube arrangement is connected, in each case, to each of the first and second flow dividers, in such a manner that the third tube communicates with its first end with a third flow opening of the first flow divider and with its second end with a third flow opening of the second flow divider and the fourth tube communicates with its first end with a fourth flow opening of the first flow divider and with its second end with a fourth flow opening of the second flow divider, and each of the third and fourth tubes of the tube arrangement is adapted, in each case, to be flowed through by measured substance and during that to be caused to vibrate.

In a first embodiment of the first additional development of the invention, it is, furthermore, provided that the third and fourth tubes of the tube arrangement are mechanically coupled with one another at least via the first and second flow dividers, in such a manner that forced mechanical oscillations of the third tube bring about coupled mechanical oscillations of the fourth tube and forced mechanical oscillations of the fourth tube bring about coupled mechanical oscillations of the third tube, and/or that forced mechanical oscillations of the first and third tubes, for example, opposite-equal bending oscillations of the first and third tubes, bring about coupled mechanical oscillations of each of the second and fourth tubes, for example, opposite-equal bending oscillations of the second and fourth tubes, and forced mechanical oscillations of the second and fourth tubes, for example, opposite-equal bending oscillations of the second and fourth tubes, bring about coupled mechanical oscillations of each of the first and third tubes, for example, opposite-equal bending oscillations of the first and third tubes, and/or that forced mechanical oscillations of each of the first, second, third and fourth tubes, in each case, bring about coupled mechanical oscillations of each of the other first, second, third, and fourth tubes. The first oscillation exciter can, furthermore, be adapted to excite, for example, differentially, mechanical oscillations of the first and third tubes, and the second oscillation exciter can be adapted to excite, for example, differentially, mechanical oscillations of the second and fourth tubes.

In a second embodiment of the first additional development of the invention, it is, furthermore, provided that the first oscillation exciter is connected mechanically both with the first tube as well as also with the third tube and the second oscillation exciter is connected mechanically both with the second tube as well as also with the fourth tube.

In a third embodiment of the first additional development of the invention, it is, furthermore, provided that each of the first and second oscillation sensors is, in each case, adapted to register, for example, differentially, oscillatory movements of the first and third tubes, in such a manner that each of the first and second oscillation measurement signals represents, for example, opposite phase, oscillatory movements of the first and third tubes; and wherein each of the third and fourth oscillation sensors is, in each case, adapted to register, for example, differentially, oscillatory movements of the second and fourth tubes, in such a manner that each of the third and fourth oscillation measurement signals represents, for example, opposite phase, oscillatory movements of the second and fourth tubes.

In a fourth embodiment of the first additional development of the invention, it is, furthermore, provided that the first and second oscillation sensors are connected mechanically, in each case, both with the first tube as well as also with the third tube, and the third and fourth oscillation sensors are connected mechanically, in each case, both with the second tube as well as also with the fourth tube.

In a fifth embodiment of the first additional development of the invention, it is, furthermore, provided that the first, second, third and fourth tubes are only pairwise of equal construction, for example, in such a manner that the first tube is only of equal construction to the third tube and the second tube is only of equal construction to the fourth tube.

In a sixth embodiment of the first additional development of the invention, it is, furthermore, provided that each of the four tubes has a caliber, which equals a caliber of each of the other tubes.

In a seventh embodiment of the first additional development of the invention, it is, furthermore, provided that the tube wall of each of the four tubes has a thickness, which equals a thickness of each of the other tubes.

In a second additional development of the invention, the measuring system further comprises a support structure, for example, a support structure embodied as a transducer-protective housing, wherein support structure and tube arrangement are secured with one another, for example, releasably, by means of the first and second flow dividers.

In a first embodiment of the second additional development of the invention, it is, furthermore, provided that the first and second oscillation exciters are mechanically connected with the support structure.

In a second embodiment of the second additional development of the invention, it is, furthermore, provided that the first, second, third and fourth oscillation sensors are mechanically connected with the support structure.

In a third additional development of the invention, the measuring system further comprises an electronics-protective housing for the measuring system electronics, for example, an electronics-protective housing secured on a support structure of the measuring transducer.

A basic idea of the invention is to utilize the sensitivity of mechanical couplings regularly arising between the tubes in measuring transducers of vibration-type to changes of the measured variable, however, also changes of the measuring transducer, in order to monitor the ability of the vibronic measuring system formed therewith to function; this, in given cases, also recurringly and without interruption of actual measurement operation.

The invention as well as advantageous embodiments thereof will now be explained in greater detail based on examples of embodiments shown in the figures of the drawing. Equal, or equally acting or equally functioning, parts are provided in all figures with equal reference characters; when perspicuity requires or it otherwise appears sensible, reference characters already shown in earlier figures are omitted in subsequent figures. Other advantageous embodiments or additional developments, especially also combinations of, firstly, only individually explained aspects of the invention, result, furthermore, from the figures of the drawing and/or from claims per se.

DETAILED DESCRIPTION

Figure 1:
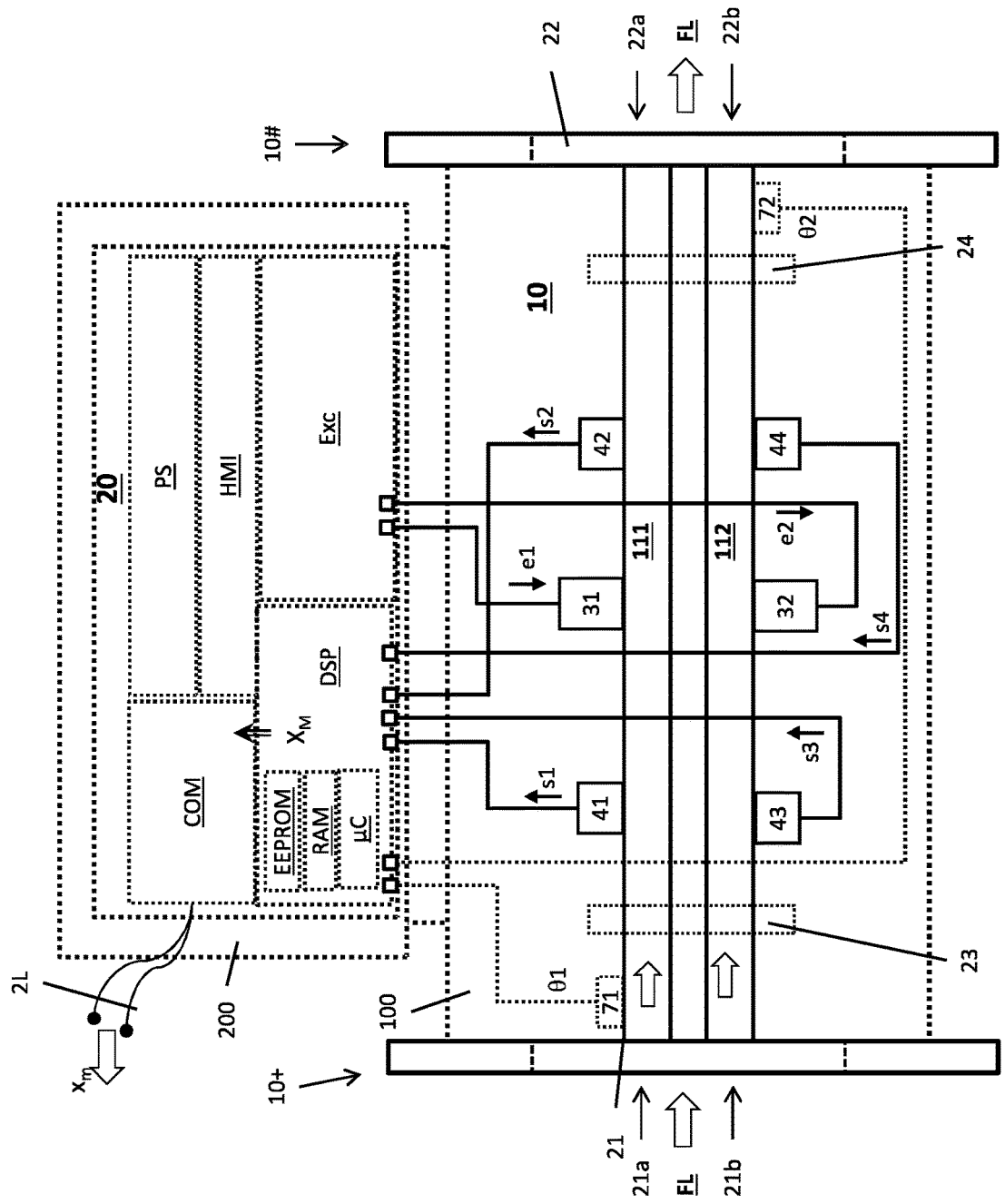
FIG. 1 shows schematically, an example of an embodiment for a measuring system of the present disclosure.
Figure 2:
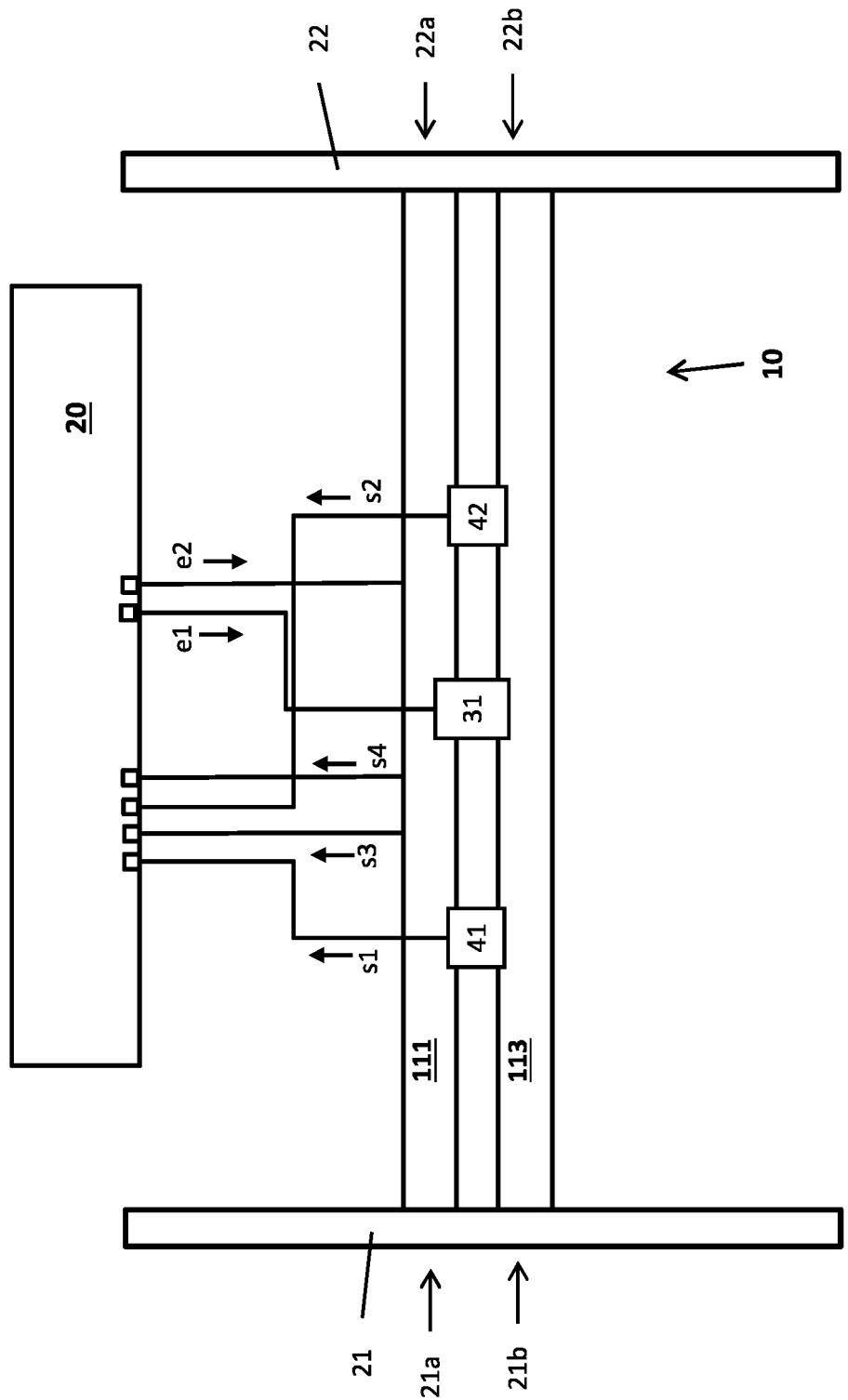
FIGS. 2, 3 shows schematically, other variants for a measuring system of the present disclosure.
Figure 3:
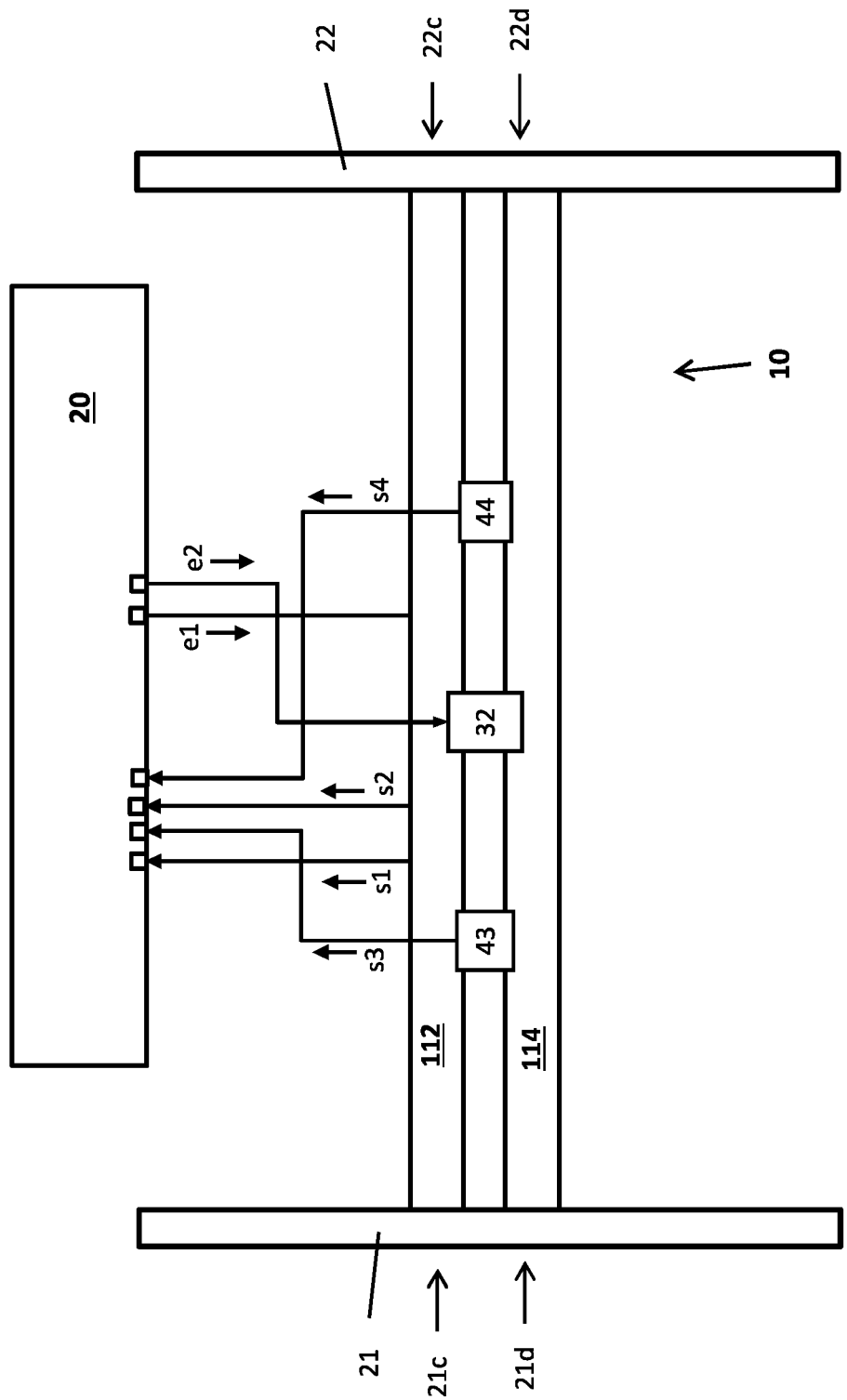

Shown schematically in FIG. 1 and FIGS. 2 and 3 are examples of embodiments for a vibronic measuring system serving for measuring and/or monitoring at least one, especially time variable, measured variable of a measured substance FL, which is flowing at least at times, and, for example, also, at least at times, two- or multiphase and/or nonuniform, wherein the measured variable can be, for example, a flow parameter, such as e.g. a mass flow ṁ, a volume flow and/or a flow velocity, or, for example, a substance parameter, such as e.g. a density ρ and/or a viscosity η, of the measured substance FL. The measuring system is, especially, provided, and adapted, to be inserted into the course of a process line serving for conveying a fluid FL as measured substance, for example, a gas, a liquid or a dispersion—and during operation to be flowed through, at least at times, by fluid FL supplied and drained via the process line. Additionally, the measuring system is provided to ascertain, especially to calculate and/or to output, sequentially in time, measured values $X_M$, in given cases, also digital measured values, quantifying at least one physical, measured variable. The process line can be, for example, a pipeline, for example, a pipeline of a filling plant, a fueling device or other industrial plant.

As shown in FIGS. 1, 2, and 3, in each case, or as directly evident from their combination, the measuring system comprises a measuring transducer 10 of vibration-type, namely a measuring transducer having a tube arrangement formed by means of at least two tubes (111, 113, 112, 114), for example, by means of exactly two or exactly four tubes, for example, at least pairwise equally embodied tubes as well as two flow dividers (21, 22) connected, in each case, thereto, an exciter arrangement (31, 32) for converting electrical power to mechanical power for exciting and maintaining forced mechanical oscillations of the tubes, as well as a sensor arrangement (41, 42, 43, 44) for registering mechanical oscillations of the tube arrangement and for providing oscillation measurement signals (s1, s2, s3, s4), for example, electrical or optical, oscillation measurement signals, in each case, representing oscillatory movements of the tube arrangement, especially of its tubes. The measuring transducer MT is, additionally, also equipped to be connected to the above-mentioned process line via an inlet end 10+ formed by one of the above described flow dividers, for example, an inlet end held by a connecting flange, as well as via an outlet end 10# formed by the other of the above described flow dividers, for example, an outlet end held by a connecting flange, and during operation to be flowed through by the measured substance FL. Additionally, each of the tubes of the tube arrangement is, furthermore, adapted to convey in its lumen a volumetric fraction of the measured substance FL and during that to be caused to vibrate, for example, in each case, to execute forced mechanical oscillations about an, in each case, associated static rest position especially forced mechanical oscillations effecting a measurable effect corresponding to the at least one measured variable and/or excited by means of the exciter arrangement; this, especially, in such a manner that each of the tubes of the tube arrangement is caused to vibrate and during that is flowed through by fluid from its first end in the direction of its second end. The forced mechanical oscillations can, such as quite usual in the case of measuring transducers of the type being discussed, be, at least partially, forced bending oscillations of the tubes about imaginary oscillation axes of the tube arrangement, namely axes imaginarily intersecting the tubes; this, especially, also in such a manner that these (two, or four) imaginary oscillation axes, for example, in the case of tubes located in static rest position are essentially parallel with one another. Besides the measuring transducer 10, the measuring system further comprises a measuring system electronics 20 for operating the measuring transducer, especially for effecting the above described mechanical oscillations of the tubes, and for evaluating oscillation measurement signals delivered by the measuring transducer, for example, for ascertaining the above described measured values therewith. The measuring system electronics is electrically coupled, for example, by means of corresponding electrical connection lines, both to the above described exciter arrangement of the measuring transducer as well as also to the above described sensor arrangement of the measuring transducer, and is formed especially by means of at least one microprocessor (μC) and/or arranged in an electronics-protective housing (200) and/or can serve as a transmitter.

Figure 4:
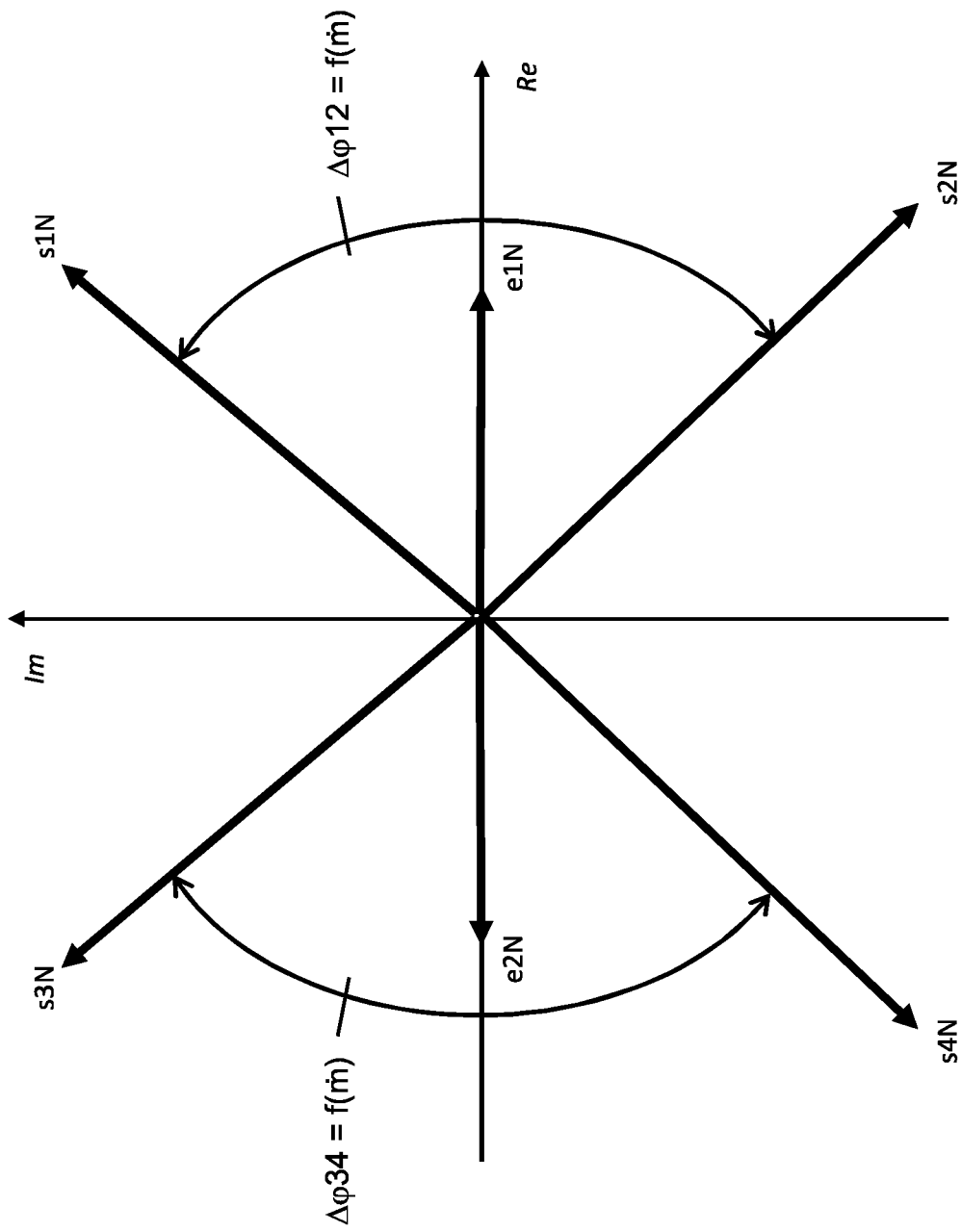
FIGS. 4, 5 shows phasor diagrams for driver- and oscillation measurement signals generated during operation of a measuring system of FIG. 1 or FIGS. 2 and 3.

The exciter arrangement of the measuring transducer 10 is, especially, provided, and adapted, to convert supplied (from the measuring system electronics 20) electrical power into mechanical power, in such a manner that the tube arrangement, especially each of its tubes, executes, at least at times, forced mechanical oscillations about static rest positions, while the sensor arrangement is provided and adapted to register mechanical oscillations of the tube arrangement, particularly mechanical oscillations and/or bending oscillations of the tubes forced by means of the exciter arrangement, and to provide a first oscillation measurement signal s1, a second oscillation measurement signal s2, a third oscillation measurement signal s3 as well as a fourth oscillation measurement signal s4, of which, for example, electrical-oscillation measurement signals s1, s2, s3, s4 each represents, at least partially, oscillatory movements of one or more of the tubes of the tube arrangement, for example, in each case, by means of a variable electrical voltage corresponding to oscillatory movements of the tubes; this, especially, in such a manner that—such as shown in FIG. 4—the oscillation measurement signals s1, s2 (in each case, a spectral signal component sN1, sN2 thereof) follow a change of mass flow of the measured substance conveyed in the tube arrangement with a change of a first phase difference Δφ12, namely a change of a difference between a phase angle of the oscillation measurement signal s1 and a phase angle of the oscillation measurement signal s2 and the oscillation measurement signals s3, s4 (in each case, a spectral signal component sN3, sN4 thereof) follow a change of mass flow of the measured substance conveyed in the tube arrangement with a change of a second phase difference Δφ34, namely a change of a difference between a phase angle of the oscillation measurement signal s3 and a phase angle of the oscillation measurement signal s4, and/or in such a manner that each of the above described oscillation measurement signals s1, s2, s3, s4 follows a change of density of the measured substance conveyed in the tube arrangement with a change of a signal frequency of at least one spectral signal component.

The tube arrangement of the measuring transducer 10 of the invention includes, such as already indicated, a first flow divider 21 with at least two flow openings (21*a*, 21*b*), for example, a first flow divider serving as a line branching and/or inlet side, first flow divider, a second flow divider 22 with at least two flow openings (22a, 22b), for example, a second flow divider embodied equally to the first flow divider 21 and/or serving as a line junction and/or outlet side, second flow divider, as well as a first tube 111, especially one at least sectionally bent and/or at least sectionally straight, and a second tube 112, for example, one at least sectionally bent and/or at least sectionally straight and/or constructed equally to the first tube and/or at least sectionally parallel to the first tube. Each of the tubes 111, 112 extends, in each case, with a tube length from a first end of the tube to a second end of the tube and includes, in each case, a lumen surrounded by a tube wall, for example, a metal tube wall, and extending, in each case, from the first end of the tube to the second end of the tube. Each of the tubes 111, 112 of the tube arrangement is connected to each of the flow dividers 21, 22, in such a manner that the tube 111 communicates with its first end with a first flow opening 21a of the flow divider 21 and with its second end with a first flow opening 22a of the flow divider 22 and the tube 112 communicates with its first end with a second flow opening 21b of the flow divider 21 and with its second end with a second flow opening 22b of the flow divider 22. In addition to the tubes 111, 112, the tube arrangement can have additional tubes, for example, as well as also indicated in FIG. 3, or evident from a combination of FIGS. 2 and 3 two more tubes, consequently, such as, among others, also disclosed in the above mentioned U.S. Pat. No. 5,602,345, WO A 96/08697, US A 2017/0356777b820, WO A 2019/081169 or WO A 2019/081170, a total of four tubes. Accordingly, in an additional embodiment of the invention, the flow divider 21 and the flow divider 22 have, in each case, especially exactly, four flow openings and the tube arrangement includes a third tube 113, especially one at least sectionally bent and/or at least sectionally straight and/or at least sectionally parallel to the tube 111, and a fourth tube 114, especially one at least sectionally bent and/or at least sectionally straight and/or constructed equally to the tube 113 and/or at least sectionally parallel to the tube 113. Each of these tubes 113, 114 of the tube arrangement extends, additionally, in each case, from a first end of the tube to a second end of the tube with a tube length and has, in each case, a lumen surrounded by a tube wall, for example, a metal tube wall, and extending, in each case, from the first end of the tube to the second end of the tube. Also, each of the tubes 113, 114 is, additionally, in each case, connected to each of the flow dividers 21, 22, in such a manner that the tube 113 communicates with its first end with a third flow opening 21c of the flow divider 21 and with its second end with a third flow opening of the flow divider 22 and the tube 114 communicates with its first end with a fourth flow opening 21d of the flow divider 21 and with its second end with a fourth flow opening 22d of the flow divider 22; this, especially, in such a manner that the tube arrangement has exactly four tubes, consequently besides the above described tubes 111, 113, 112, 114 no further tubes connected to the flow divider 21 and the flow divider 22.

For the mentioned case, in which the tubes of the tube arrangement are bent, the above-mentioned tube length corresponds to a straightened length, or a length of an imaginary center line of the tube. The tube length of the tube 111 preferably equals the tube length of the tube 112. In the case of a tube arrangement having four tubes, the tube length of the tube 113 preferably equals the tube length of the tube 114; this, for example, also in such a manner that the tube length of the tube 111 only equals the tube length of the tube 112, equally as well, is greater than the tube length of both the tube 113 as well as also the tube 114, and the tube length of the tube 113 only equals the tube length of the tube 114, equally as well, is less than the tube length both of the tube 111 as well as also the tube 112. The tube wall of each of the tubes of the tube arrangement has, in an additional embodiment of the invention, in each case, a predetermined, for example, also essentially uniform—thickness and can—such as quite usual in the case of tube arrangements of the type being discussed, or measuring transducers or measuring systems formed therewith, for example, be of equal material and/or a metal, especially, in each case, a stainless steel or, in each case, a nickel based alloy; this, for example, also in such a manner that the tube wall of each of the tubes of the tube arrangement has a thickness, which equals a thickness of the other tube or each of the other tubes and/or that each of the tubes of the tube arrangement has a caliber, namely an inner diameter, which equals a caliber of the other tube, or each of the other tubes. In an additional embodiment of the invention, each of the tubes has, in each case, a caliber, which amounts to not less than 1 mm, for example, also, in each case, to greater than 10 mm and/or the tube wall of each of the tubes has, in each case, a smallest thickness, which is not less than 0.5 mm, for example, also greater than 1.5 mm and/or equal to the smallest thickness of the tube wall of each of the other the tubes. The tubes of the tube arrangement can, additionally, for example, in each case, be embodied as one piece, for example, seamlessly or at least have a tube wall of metal made with a welded seam, and/or, in each case, be formed by bending a tubular, semifinished piece, for example, in such a manner that each of the tubes is embodied essentially V-shaped, i.e. has a V-shaped outline and/or that each of the tubes has, as a result, a tube form lying in a single (bending) plane. For the above described case, in which the tube arrangement includes four tubes, the tubes can, for example, also be so embodied that they are only pairwise of equal construction, for example, in such a manner that the tube 111 is only of equal construction to the tube 112 and the tube 113 is only of equal construction to the tube 114.

For setting mechanical oscillation characteristics of the tube arrangement, particularly for setting one or more resonance frequencies of its tubes, the tube arrangement can, as well as also indicated in FIG. 1, furthermore, have a first coupling element 23, for example, a plate shaped, first coupling element, especially one positioned farther removed from the flow divider 22 then from the flow divider 21, and connected mechanically with each of its tubes, as well as at least a second coupling element 24, for example, a plate shaped second coupling element and/or one constructed equally to the coupling element 23, especially a second coupling element positioned farther removed from the flow divider 21 than from the flow divider 22 and mechanically connected with each of its tubes. For connecting the tube arrangement, and the measuring transducer or measuring system formed therewith, with the above referenced process line conveying the measured substance FL, additionally, the flow divider 21 can have a first connecting flange, for example, one connecting the tube arrangement to a line segment of the process line serving during operation for supplying the fluid FL—and the flow divider 22 can have a second connecting flange, for example, one connecting the tube arrangement to a line segment of the process line serving for removing the fluid FL. Embodied on each of the above described connecting flanges can be, for example, in each case, a sealing surface for fluid tight, leakage free connecting of the tube arrangement with a desired line segment of the process line.

In an additional embodiment of the invention, the measuring system further includes an, especially bending- and/or twist resistant, support structure 100, wherein, as well as also shown schematically in FIG. 1—the support structure 100 and the tube arrangement are secured to one another, for example, releasably, by means of the flow dividers 21, 22. For protecting the measuring transducer, and its components, against damaging environmental influences, for preventing undesired sound emissions by the vibrating tubes or for accommodating measured substance escaping from a leaking tube arrangement, it is possible, such as quite usual in the case of vibronic measuring systems of the type being discussed, that the support structure 100 be embodied as a transducer-protective housing jacketing the tubes 111, 112 of the tube arrangement, for example, in such a manner that the transducer-protective housing has a pressure resistance, which is greater than a greatest pressure resistance of the tubes of the tube arrangement and/or amounts to greater than 50 bar.

In the case of the measuring system of the invention as already mentioned, each of the tubes of the tube arrangement, consequently each of the tubes 111, 112 and, in given cases, also the tubes 113, 114, is especially, in each case, adapted to be flowed through by measured substance FL (or a volume fraction thereof) and during that to be caused to vibrate. For such purpose, the exciter arrangement in the case of the measuring system of the invention includes two, for example, electrodynamic and/or equally constructed, oscillation exciters 31, 32, of which a first oscillation exciter 31, for example, an electrodynamic or piezoelectric, first oscillation exciter, is mechanically connected with the tube 111 (equally as well, not with the tube 112), and, for example, positioned at the halfway point on the tube 111, and of which a second oscillation exciter 32, for example, an electrodynamic or piezoelectric, second oscillation exciter is mechanically connected with the tube 112 (equally as well, not with the tube 111), and, for example, positioned at the halfway point on the tube 112. Each of the oscillation exciters 31, 32 is, additionally, in each case, adapted to convert electrical power having a time variable, electrical current into mechanical power, especially in such a manner that the oscillation exciters exert time variable driving forces on the respective tubes at points of engagement, namely points of engagement formed by means of the oscillation exciters on the tubes mechanically connected therewith. For the above described case, in which the tube arrangement includes four tubes, in an additional embodiment of the invention, the oscillation exciter 31 is adapted to excite mechanical oscillations of the two tubes 111, 113 and the oscillation exciter 32 is adapted to excite mechanical oscillations of the other two tubes 112, 114; this, especially, in such a manner that the oscillation exciter 31 acts differentially between the two tubes 111, 113, namely can introduce, or introduces, only opposite-equal excitation forces into the two tubes 111, 113 and the oscillation exciter 32 acts differentially on the two tubes 112, 114, namely can introduce, or introduces, only opposite-equal excitation forces into the two tubes 112, 114. The oscillation exciter 31 can, for such purpose, be mechanically connected, for example, both with the tube 111 as well as also with the tube 113 and the oscillation exciter 32 can correspondingly be mechanically connected both with the tube 112 as well as also with the tube 114, for example, in such a manner that the above-mentioned driving forces act both on the tube 111 as well as also the tube 113, and on both the tube 112 as well as also the tube 114. Particularly for the other case, in which the measuring system includes the above-mentioned support structure and the tube arrangement has exactly two tubes, the oscillation exciters 31, 32, can, for example, be mechanically connected partly with the support structure 100, for example, in such a manner that the above-mentioned driving forces act between the tube 111, or the tube 112, as the case may be, and the support structure.

For producing the above described oscillation measurement signals s1, s2, s3, s4, the sensor arrangement includes at least four oscillation sensors, for example, equally constructed oscillation sensors and/or mutually spaced oscillation sensors, of which a first oscillation sensor 41 and a second oscillation sensor 42, for example, in the form of electrodynamic or optical sensors, are positioned mutually spaced, for example, also symmetrically to the oscillation exciter 31, along the tube 111 and of which a third oscillation sensor 43 and a fourth oscillation sensor 44, for example, in the form of electrodynamic or optical sensors, are positioned mutually spaced, especially symmetrically to the oscillation exciter 32, along the tube 112. Each of the oscillation sensors 41, 42 is, in each case, adapted to register oscillatory movements of the tube 111 and correspondingly to convert such into the above-mentioned oscillation measurement signal s1, and the above-mentioned oscillation measurement signal s2 and each of the oscillation sensors 41, 42 is, in each case, adapted to register oscillatory movements of the tube 112 and correspondingly to convert such into the above-mentioned oscillation measurement signal s3, and the above-mentioned oscillation measurement signal s4; this, especially, in such a manner that each oscillation measurement signals s1, s2, s3, s4 represents the corresponding oscillatory movements, or that each of the oscillation measurement signals s1, s2, s3, s4 contains, in each case, one or more sinusoidal signal components with, in each case, a frequency corresponding to an oscillation frequency of oscillatory movements of the tube 111 and the tube 112, respectively. As also indicated in FIG. 1, or directly evident from a combination of FIGS. 1, 2 and 3, the oscillation sensors 41, 42, 43, 44 can, additionally, for example, also be so positioned that the oscillation sensor 41 and the oscillation sensor 43 register, in each case, inlet side, oscillatory movements of the tube 111 and the oscillation sensor 42 and the oscillation sensor 44 register, in each case, outlet side, oscillatory movements of the tube 112. Additionally, the oscillation sensors can, for example, also be positioned in such a manner that the oscillation sensor 41 is spaced equally far from the flow divider 21 as the oscillation sensor 42 is from the flow divider 22 and/or that the oscillation sensor 43 is spaced equally far from the flow divider 21 as the oscillation sensor 44 is from the flow divider 22, and/or in such a manner that the two oscillation sensors 41, 42 are, in each case, positioned equally far from the above described oscillation exciter 31 and/or the two oscillation sensors 43, 44 are, in each case, positioned equally far from the above described oscillation exciter 32.

Particularly for the above described case, in which the oscillation sensors are electrodynamic, consequently embodied in the manner of oscillatory, or solenoid oscillation sensors, it is provided in an additional embodiment of the invention that both the oscillation sensor 41 as well as also the oscillation sensor 42 are, at least partially, mechanically connected at least with the tube 111, especially, however, not with the tube 112, and both the oscillation sensor 43 as well as also the oscillation sensor 44 are, at least partially, mechanically connected at least with the tube 112, especially, however, not with the tube 111. For the other case, in which the measuring system includes a support structure and the tube arrangement with exactly two tubes, the oscillation sensors can correspondingly also be connected mechanically on one side with the support structure, for example, in such a manner that the oscillation sensors 41, 42, 43, and 44 register, in each case, oscillatory movements of the tubes 111, and 112 relative to the support structure. For such purpose, the oscillation sensors 41, 42 can be connected mechanically, in each case, both with the tube 111 as well as also with the support structure and the oscillation sensors 43, 44 can be connected mechanically, in each case, both with the tube 112 as well as also with the support structure. For the other previously indicated case, in which the tube arrangement includes four tubes, as well as also indicated in FIGS. 2 and 3, or directly evident from their combination, both the oscillation sensor 41 as well as also the oscillation sensor 42 can be connected mechanically with each of the two tubes 111, 113 and both the oscillation sensor 43 as well as also the oscillation sensor 44 can be connected mechanically with each of the two tubes 112, 114, for example, in such a manner that the oscillation sensor 41 and the oscillation sensor 43 register, in each case, inlet side, oscillatory movements of the tubes 111, 112, 113, and 114 and the oscillation sensor 42 and the oscillation sensor 44 register, in each case, outlet side, oscillatory movements of the tubes 111, 112, 113, respectively 114. Additionally, the oscillation sensors 41, 42 can for this case be adapted to register opposed, consequently opposite phase, in given cases, also opposite-equal, oscillatory movements of the tubes 111, 113 and to convert such into the oscillation measurement signals s41, s42 (in each case, representing the oscillatory movements) and, accordingly, also each of the above described oscillation sensors 43, 44 can be adapted to register opposed, consequently opposite phase, in given cases, also opposite-equal, oscillatory movements of the tubes 112, 114 and to convert such into the oscillation measurement signals (in each case, representing the oscillatory movements); this, for example, also in such a manner that the oscillation sensors 41, 42 are adapted to register the oscillatory movements of the two tubes 111, 113 differentially, namely to convert only opposed oscillatory movements of the tubes 111, 113 into the oscillation measurement signals s1, s2, and the oscillation sensors 43, 44 are adapted to register the oscillatory movements of the two tubes 112, 114 differentially, namely to convert only opposed oscillatory movements of the tubes 112, 114 into the oscillation measurement signals s3, s4. For such purpose, the oscillation sensors 41, 42 can be connected mechanically, in each case, both with the tube 111 as well as also with the tube 113 and the oscillation sensors 43, 44 can be connected mechanically, in each case, both with the tube 112 as well as also with the tube 114.

For additional improving of the accuracy, with which the measured values $X_M$ are ascertained, the measuring transducer can, as well as also shown schematically in FIG. 1, furthermore, also have temperature sensors 71, 72 serving for registering temperatures within the tube arrangement and or providing corresponding temperature measurement signals θ1, θ2, for example, in each case, temperature sensors applied directly to the tubes of the tube arrangement, and/or strain sensors serving for registering mechanical stresses within the tube arrangement and providing corresponding strain measurement signals, for example, in each case, strain sensors applied directly to the tubes of the tube arrangement.

As already mentioned, the measuring system comprises, supplementally to the measuring transducer 10, a measuring system electronics 20 electrically coupled therewith, thus with the exciter arrangement of the measuring transducer 10 as well as also with its sensor arrangement. The measuring system electronics 20 can, for example, be programmable and/or remotely parameterable, for example, be formed correspondingly by means of at least one microprocessor and/or at least one digital signal processor (DSP) and/or by means of a programmable logic chip (FPGA) and/or by means of an application-specific, integrated circuit (ASIC). Furthermore, the measuring system electronics 20 can be supplied with the electrical energy required during operation by means of an internal energy storer and/or from the exterior of the measuring system electronics 20 via connection cable. The electrical coupling, or connecting, of the measuring transducer 10 to the measuring system electronics 20 can occur by means of corresponding electrical connection lines and corresponding electrical cable glands. The connection lines can, in such case, be embodied, at least partially, as electrical line wires surrounded, at least sectionally, by an electrical insulation, e.g. in the form of "twisted-pair" lines, flat ribbon cables and/or coaxial cables. Alternatively thereto or in supplementation thereof, the connection lines can at least sectionally also be formed by means of conductive traces of an, especially flexible, in given cases, lacquered, circuit board. The measuring system electronics 20 can, additionally, as well as also shown schematically in FIG. 1—be accommodated, for example, in a corresponding, especially impact- and/or even explosion resistant and/or at least water spray protective, electronics housing 200 and, additionally, be so designed that during operation of the measuring system it can exchange measuring—and/or other operating data, for example, also status reports, such as, for instance, in each case, current measured values or settings- and/or diagnostic values serving for control of the measuring system, with a superordinated, electronic data processing system (not shown), for example, a programmable logic controller (PLC), a personal computer and/or a work station, via a data transmission system, for example, a fieldbus system and/or wirelessly per radio. Accordingly, the measuring system electronics 20 can have, for example, a transmitting- and receiving circuit COM, which during operation is fed from a (central) evaluation- and supply unit provided in the above described data processing system remotely from the measuring system. For example, the measuring system electronics 20 (and its above-mentioned transmitting- and receiving circuit COM) can, additionally, be so embodied that it is electrically connectable via a two-conductor connection 2L, in given cases, also configured as a 4-20 mA-electrical current loop, to the above described remote electronic data processing system and via that can both draw the electrical power required for operation of the measuring system from the above described evaluation- and supply unit of the data processing system as well as also transmit, in given cases, digitized, measured values to the data processing system, for example by (load) modulation of a direct current supplied from the evaluation- and supply unit. Additionally, the measuring system electronics 20 can also be so embodied that it can be operated nominally with a maximum power of 1 W or less and/or is intrinsically safe. The measuring system electronics 20 can, additionally, for example, also be built modularly, in such a manner that diverse electronics-components of the measuring system electronics 20 are arranged on their own circuit boards and/or formed by means of one or more microprocessors, such as, for example, a measuring- and evaluation circuit DSP formed by means of one or more microprocessors and/or by means of one or more digital signal processors for processing and evaluating the (oscillation) measurement signals provided by the measuring transducer 10, a driver circuit Exc for operating the measuring transducer, in particular its exciter arrangement, an internal power supply circuit PS for providing one or more internal operating voltages and/or the above-mentioned transmitting- and receiving circuit COM serving for communication with a superordinated measurement data processor system and/or an external fieldbus. As evident from FIG. 1, the transmitting- and receiving circuit COM can, for example, also provide for an output ($x_m$), for example, of measured values ($X_M$) internally ascertained by the measuring- and control circuit DSP of the measuring system. Accordingly, the transmitting- and receiving circuit COM can, additionally, be adapted to convert received measured values $X_M$ into an output signal $x_m$ providing the measured values $X_M$, for example, an output signal conforming to an industrial standard, for example, DIN IEC 60381-1:1985-11, IEC 61784-1 CPF1 (Foundation Fieldbus), IEC 61784-1 CPF3 (Profibus), IEC 61158 or IEC 61784-1 CPF9 (HART). For visualizing measuring system internally produced measured values ($X_M$) and/or measuring system internally generated status reports, such as, for instance, a error report or an alarm, on-site, the measuring system can, furthermore, have a display- and interaction element HMI communicating, at least at times, also with the measuring system electronics 20, such as, for instance, an LCD-, OLED- or TFT display placed in the electronics housing 200 behind a window correspondingly provided therein, as well as a corresponding input keypad and/or a touch panel. For the case, in which the measuring system includes the above-mentioned support structure 100 formed as a transducer-protective housing, the electronics-protective housing 200 can, for example, as well as also shown schematically in FIG. 1, be secured on the support structure.

The measuring system electronics 20 of the measuring system of the invention is, especially, adapted to supply electrical current to the oscillation exciter 31, namely to supply an electrical, first driver signal e1 to the first oscillation exciter 31, as well as to supply electrical current to the second oscillation exciter 32, namely to supply an electrical, second driver signal e2 to the second oscillation exciter 32, whereby the tube 111, or the tubes 111, 113, execute forced mechanical oscillations, for example, bending oscillations, with one or more oscillation frequencies predetermined by the driver signal e1 and the tube 112, or the tubes 112, 114, execute forced mechanical oscillations, for example, bending oscillations, with one or more oscillation frequencies predetermined by the driver signal e2. Moreover, the measuring system electronics is adapted in a first operating mode to provide both the driver signal e1 with a first wanted electrical current eN1, namely to produce an as regards an electrical current level dominating, or single, sinusoidal electrical current component having an (alternating electrical current) frequency and to supply such to the oscillation exciter 31, as well as also the second driver signal e2 with at least a second wanted electrical current eN2, namely to produce an as regards an electrical current level dominating, or single, sinusoidal electrical current component having an (alternating electrical current) frequency and to supply such to the oscillation exciter 32, in such a manner that at least the tube 111 executes, at least partially, especially predominantly, first wanted oscillations, namely mechanical oscillations forced by the (electrical current supplied) oscillation exciter 31 and having at least a first wanted frequency fN1, namely an oscillation frequency corresponding to the (alternating electrical current) frequency of the wanted electrical current eN1, and at least the tube 112 executes, at least partially, especially predominantly, second wanted oscillations, namely mechanical oscillations forced by the (electrical current supplied) oscillation exciter 32 and having at least a second wanted frequency fN2, namely an oscillation frequency corresponding to the (alternating electrical current) frequency of the wanted electrical current eN2, and that each of the oscillation signals s1, s2 has, as well as also indicated in FIG. 4, in each case, a first wanted signal component sN1 and, respectively, a second wanted signal component sN2, namely sinusoidal signal components with a frequency corresponding to the first wanted frequency, and each of the oscillation signals s3, s4 has, as well as also indicated in FIG. 4, in each case, a third wanted signal component sN3 and, respectively, a fourth wanted signal component sN4, namely sinusoidal signal components having a frequency corresponding to the second wanted frequency fN2; this, for example, also in such a manner that the first wanted oscillations and/or second wanted oscillations are suitable to bring about in the flowing measured substance Coriolis forces dependent on mass flow. For generating the driver signals e1, e2, the measuring system electronics 20 can, as well as also shown schematically in FIG. 1 and as quite usual in the case of such measuring systems—have, for example, one or more separate driver circuits Exc, especially, in each case, driver circuits formed by means of one or more phase control loops (PLL—phase locked loop) serving for ascertaining and setting the wanted frequencies fN1 and fN2.

The program-code executed during operation of the measuring system in the measuring system electronics 20, for example, in one or more of the above described microprocessors or digital signal processors of the measuring system electronics 20, can be stored persistently in each case, e.g. in one or more non-volatile data memories (EEPROM) of the measuring system electronics 20 providing the digital data without an applied operating voltage and in the case of startup be loaded into a volatile data memory (RAM) provided in the measuring system electronics 20, for instance, in the above described measuring- and evaluation circuit DSP, e.g. integrated in the microprocessor. For processing in the microprocessor, or in the digital signal processor, the oscillation measurement signals s1, s2, s3, s4 are converted by means of corresponding analog to-digital converters (A/D), firstly, into corresponding digital signals, for example, by suitably digitizing the signal voltages of the electrical-oscillation measurement signals s1, s2, s3, s4; compare, for example, the above cited U.S. Pat. No. 6,311, 136. Accordingly, there can be provided in the measuring system electronics 20, for example, in the above described measuring- and evaluation circuit DSP, corresponding analog to-digital-converters for the oscillation measurement signal s1, s2, s3, s4 and/or at least one non-volatile electronic data memory EEPROM adapted to provide digital data, especially without requiring an applied operating voltage.

The above-mentioned (alternating electrical current) frequency of the wanted electrical current eN1, consequently the first wanted frequency fN1, can, for example, correspond to a resonant frequency of the tube arrangement, for example, a lowest resonant frequency of the tube 111, dependent on the density of the measured substance FL conveyed in the tube arrangement and the above-mentioned (alternating electrical current) frequency of the wanted electrical current eN2, consequently the second wanted frequency fN2, can, for example, correspond to a second resonant frequency of the tube arrangement, in given cases, a second resonant frequency also differing from the above described, first resonant frequency, for example, a lowest resonant frequency of the tube 112, also dependent on the density of the in the tube arrangement conveyed measured substance FL. Accordingly, the measuring system electronics 20 is in an additional embodiment of the invention, furthermore, adapted to provide the wanted-electrical current component eN1 of the driver signal e1 with an (alternating electrical current) frequency, which differs from a resonant frequency fr1 of the tube 111 by less than 1% of the resonant frequency fr1 and/or by less than 1 Hz, and/or to provide the wanted-electrical current component eN2 of the driver signal e2 with an (alternating electrical current) frequency, which differs from a resonant frequency fr2 of the tube 112 by less than 1% of the resonant frequency fr2 and/or by less than 1 Hz. For the typical case, in which the above described resonance frequencies fr1, fr2 are equally large (fr1=fr2), consequently the tubes 111, 112 have at least one common resonant frequency fr12, the measuring system electronics can, furthermore, especially be adapted to provide the wanted-electrical current component eN1, eN2, in each case, with an (alternating electrical current) frequency, which differs from the above described common resonant frequency fr12 by less than 1% of the resonant frequency fr12 and/or by less than 1 Hz, for example, also in such a manner that a phase difference of 180° is set between the two wanted electrical currents eN1, eN2. The above described common resonant frequency fr12 can be, for example, a resonant frequency fr12 of a natural bending oscillation mode inherent to the measuring transducer, for example, a bending oscillation fundamental mode, in which the two tubes 111, 112 can perform, or execute, opposite phase, mechanical oscillations. Thus, the measuring system electronics can also be adapted to supply to the oscillation exciters 31, 32 in the first operating mode driver signals e1, e2 forcing the opposite phase, mechanical oscillations.

Besides generating the two driver signals e1, e2, the measuring system electronics 20 is, additionally, adapted in the first operating mode to receive and to evaluate the oscillation signals s1, s2, s3, s4, namely based on the oscillation signals s1, s2, s3, s4, particularly at least based, in each case, on one of the above described, wanted signal components sN1, sN2, sN3, sN4, to ascertain the above mentioned measured values for the at least one physical, measured variable, for example, based on the above described, first phase difference $\Delta\varphi12$ and/or based on the above described second phase difference $\Delta\varphi34$, to generate mass flow-measured values, namely measured values $X_M$ representing the mass flow of the measured substance FL and/or based on at least one signal frequency of at least one of the oscillation measurement signals s41, s42, s43, s44, for example, based on one of the above described, wanted frequencies fN1, fN2 of at least one of the oscillation measurement signals s1, s2, s3, s4, to generate density-measured values, namely measured values representing the density p of the measured substance FL; this, for example, even in a manner typical in the case of measuring systems of the type being discussed, particularly also in measuring systems known from the above cited US-A 2006/0266129, US-A 2007/0113678, US-A 2010/0011882, US-A 2012/0123705, US-A 2017/0356777, U.S. Pat. Nos. 5,602,345, 5,926,096, WO-A 2009/136943, WO-A 2019/017891, WO-A 2019/081169, WO-A 2019/081170, WO-A 87/06691, WO-A 96/05484, WO-A 96/08697, WO-A 97/26508, WO-A 99/39164 or applicant's own international patent application PCT/EP2019/082044 not published as of the earliest filing date to which this application is entitled. Alternatively or supplementally, the measuring system electronics 20 can also be provided and adapted, based on at least one of the oscillation measurement signals s41, s42, s43, s44, and/or at least one of the driver signals e1, e2, to generate viscosity-measured values, namely measured values representing the viscosity of the measured substance FL. The processing of the oscillation measurement signals, in given cases, also a quite usual operating of the above described driver circuit(s) Exc of such measuring systems, can, as well as also shown schematically in FIG. 1—occur, for example, via the above described measuring- and evaluation circuit DSP.

In the case of the tube arrangement of the measuring transducer 10, its tubes 111, 112, or its tubes 111, 112, 113, 114, as the case may be, are naturally mechanically coupled with one another at least via the two flow dividers 21, 22, in given cases, supplementally also via the above described coupling elements, in such a manner that forced mechanical oscillations of the tube 111 therewith bring about coupled mechanical oscillations of the tube 112 and forced mechanical oscillations of the tube 112 therewith bring about coupled mechanical oscillations of the tube 111. For the above described case, in which the tube arrangement is formed by means of four tubes, also the tubes 113, 114 are equally mechanically coupled with one another at least via the two flow dividers 21, 22, in such a manner that forced mechanical oscillations of the tube 113 therewith bring about coupled mechanical oscillations of at least the tube 114 and forced mechanical oscillations of the tube 114 therewith bring about coupled mechanical oscillations of the tube 113; especially the tubes 111, 112, 113, 114 are so mechanically coupled with one another that forced mechanical oscillations of the tubes 111,113, particularly opposite-equal bending oscillations of the tubes 111, 113, can bring about coupled mechanical oscillations of each of the tubes 112, 114, for example, also opposite-equal bending oscillations of the tubes 112, 114, and forced mechanical oscillations of the tubes 112, 114, particularly opposite-equal bending oscillations of the tubes 112, 114, can bring about coupled mechanical oscillations of each of the tubes 111, 113, for example, also opposite-equal bending oscillations of the tubes 111, 113, and that forced mechanical oscillations of each of the tubes 111, 112 113, 114 can bring about therewith, in each case, coupled mechanical oscillations of each of the other tubes 111, 112 113, 114. As a result of this mechanical coupling of the tubes of the tube arrangement, the one or more tubes 112, or 112, 114, in each case, execute not only the above referenced mechanical oscillations, namely mechanical oscillations forced by means of the oscillation exciter 32 supplied with electrical current by the driver signal e2, but, instead, additionally, also mechanical oscillations coupled with at least one of the oscillations of the one or more tubes 111, or 111, 113, and the one or more tubes 111, or 111, 113, in each case, execute not only the above referenced mechanical oscillations, namely mechanical oscillations forced by means of the oscillation exciter 31 supplied with electrical current by the driver signal e1, but, instead, additionally, also mechanical oscillations coupled with at least one of the oscillations of the tube 112, or the tubes 112, 114. Based on such coupled oscillations, for example, measured values representing the at least one physical, measured variable can likewise be ascertained. Additionally, based on the coupled oscillations, also an operating state of the measuring system can be characterized, and, associated therewith, an ability of the measuring system to function can be checked during operation. The operating state can, for example, correspond to, or specify, a measuring system function (or even transfer function) inherent to the measuring system and determining one or more functional dependencies of one or more of the oscillation measurement signals on one or more of the driver signals; this especially in such a manner that a temporal change of the operating state, or a—temporary or continuous—deviation of the operating state from a predetermined reference state corresponds to a change of the above described system function of the measuring system, consequently a degrading of the ability of the measuring system to function.

Figure 5:
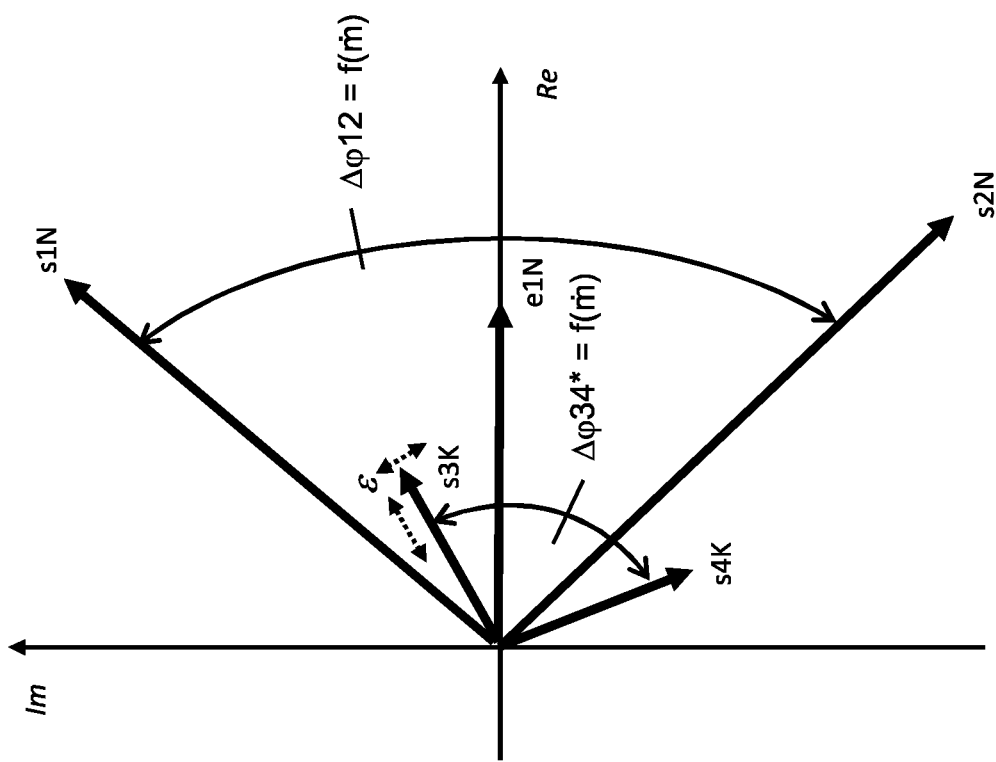

Additionally according to the invention, the measuring system electronics 20 is, furthermore, adapted to operate in a second operating mode, for example, before and/or after the first operating mode, in given cases, also a second operating mode automatically activated by the measuring system electronics 20, and during that, to produce, at least temporarily, the driver signal e1 with the wanted electrical current eN1 and to supply such to the oscillation exciter 31, for example, to supply electrical current to the oscillation exciter 31 as in the first operating mode, at the same time, however, to supply no driver signal containing the wanted-electrical current component eN2 to the oscillation exciter 32, in such a manner that the one or more tubes 111, or 111, 113, execute, at least partially, first wanted oscillations and the one or more tubes 112, or 112, 114, execute mechanical oscillations coupled with the first wanted oscillations and having the wanted frequency fN1, while at the same time executing no second wanted oscillations, and that, as a result, each of the oscillation signals s1, s2 has, in each case, the wanted signal components sN1 and sN2, respectively, and each of the oscillation signals s3, s4 has, as well as also indicated in FIG. 5, in each case, coupling signal components sK3 and sK4, respectively, namely a particular sinusoidal signal component having a frequency corresponding to the (alternating electrical current) frequency of the wanted electrical current eN1 of the driver signal e1. Moreover, the measuring system electronics 20 is adapted in the second operating mode to receive and to evaluate at least the oscillatory signal s3 and/or the oscillatory signal s4, in given cases, also both oscillation signals s3, s4 and/or the oscillatory signal s1 and/or the oscillatory signal s2 or all oscillation signals s1, s2, s3, s4, for example, in order to ascertain measured values representing the at least one physical, measured variable and/or to check an ability of the measuring system to function. In an additional embodiment of the invention, the measuring system electronics is, accordingly, furthermore, adapted to win or ascertain from one or each of the oscillation signals s3, s4 received in the second operating mode the coupling signal components sK3 and sK4, respectively. For example, the measuring system electronics 20 can be adapted at least in the second operating mode to ascertain mass flow-measured values based on the above described phase difference $\Delta\varphi12$ as well as based on a third phase difference $\Delta\varphi34^*$, namely a difference between a phase angle of the coupling signal component sK3 of the oscillation signal s3 also on dependent mass flow of the measured substance and a phase angle of the coupling signal component sK4 of the oscillation signal s4 likewise dependent on mass flow of the measured substance.

In an additional embodiment of the invention, the measuring system electronics 20 is, especially, also adapted, based on at least one of the oscillation signals s3, s4 received in the second operating mode, especially their coupling signal components sK3 and sK4, respectively, to detect, whether a disturbance $\varepsilon$ of the measuring system is present, for example, a disturbance, which reduces an ability of the measuring system to function, or effects a malfunctioning of the measuring system and/or which reduces an integrity of at least one of the oscillation measurement signals s1, s2, s3, s4, consequently also an integrity of measured values won from the oscillation measurement signals s1, s2, s3, s4 and/or brings about measurement errors in the measured values.

The disturbance $\varepsilon$ can, as well as also indicated in FIG. 5—significantly influence a phase angle and/or an amplitude of at least one of the coupling signal components sK3 and sK4, for example, in such a manner that the above-mentioned phase difference $\Delta\varphi34^*$ differs from the phase difference $\Delta\varphi12$ and/or a corresponding reference value by more than an earlier ascertained measure of tolerance. Additionally, the measuring system electronics 20 can, furthermore, be adapted to output a (disturbance) report, for example, a (disturbance) alarm, in case a disturbance of the measuring system is detected. The disturbance $\varepsilon$ of the measuring system can occur, for example, due to a deposit on an inside of the tube wall of one or more of the tubes, a reduction of thickness of the tube wall of one or more of the tubes, an aging of one or more of the oscillation sensors and/or an aging of one or more of the oscillation exciters. The disturbance $\varepsilon$ of the measuring system can, especially, also comprise an, in given cases, irreversible, change of one or more oscillation characteristics of the tube arrangement, for instance, due to a reduced thickness of the tube wall of one or more of the tubes and/or due to plastic deformation of one or more of the tubes and/or due to a deposit on an inside of the tube wall of one or more of the tubes and/or due to a crack in the tube wall of one or more of the tubes. For the case, in which the above-mentioned support structure and the tube arrangement are, as proposed in the above cited WO-A 96/08697 or WO-A 2019/017891, releasably secured with one another, for example, to enable a bringing together, or mounting, of support structure and tube arrangement on-site at the measuring point, or in its vicinity, the disturbance $\varepsilon$ of the measuring system can, however, also come, for example, from a defective installation of support structure and tube arrangement. Additionally, the disturbance of the measuring system can also come from an, in given cases, irreversible change of one or more flow characteristics of the tube arrangement, for instance, due to a reduced flow cross section of the tube arrangement, for example, as a result of a plugging of one or more of the tubes and/or as a result of a deposit on an inside of the tube wall of one or more of the tubes and/or an, in given cases, also irreversible change of one or more electromechanical-transducer characteristics, for instance, due to an aging of one or more of the oscillation sensors and/or oscillation exciters and/or due to a change of a mechanical connection between one or more oscillation sensors, or one or more oscillation exciters and the tube or tubes, to which they are attached. Disturbance of the measuring system can, however, also result from an, in given cases, also irreversible, change of a (scale) zero point of the measuring system, which can correspond, for example, to an aforementioned phase difference $\Delta\varphi12$, $\Delta\varphi34$ measured at resting measured substance and/or from an, in given cases, also irreversible, change of a (measuring) sensitivity of the measuring system, which can correspond to a change of the phase difference $\Delta\varphi12$, $\Delta\varphi34$ referenced to a change of the mass flow.

The detection one or more of these disturbances a of the measuring system can occur, for example, by means of a simple comparison of measured values for the at least one measured variable ascertained based on oscillation signals received in the first operating mode with measured values for the measured variable ascertained based on oscillation signals received in the second operating mode. For example, for checking the ability of the measuring system to function, thus for detecting the above described disturbance $\varepsilon$, the mass flow-measured values ascertained in the second operating mode based on the phase differences Δφ12, Δφ34* can be compared with mass flow-measured values ascertained in the first operating mode based on the phase differences Δφ12, Δφ34, and/or (fractional) mass flow-measured values ascertained in the second operating mode based on the phase difference Δφ34* can be compared with (fractional) mass flow-measured values ascertained in the second operating mode based on the phase difference Δφ12. Alternatively or supplementally for such purposes, also the two, nominally proportional, phase differences Δφ12, Δφ34* can be compared with one another by means of the measuring system electronics 20. Accordingly, the measuring system electronics 20 in an additional embodiment of the invention is, furthermore, adapted to compare the phase difference Δφ12 and the phase difference Δφ34* with one another, for example, in order, in the case of a too large difference, namely a deviation exceeding a predetermined reference value, to output the above-mentioned (disturbance) report. Particularly also for the mentioned case, in which the tube 111 has a resonant frequency fr1 deviating from the resonant frequency fr2 of the tube 112, or the tubes 111, 113 have a resonant frequency fr1 deviating from the resonant frequency fr2 of the tubes 112, 114, the measuring system electronics 20 can, advantageously, furthermore, also be adapted to provide the wanted-electrical current component eN1 of the driver signal e1 with an (alternating electrical current) frequency, which differs from the above described resonant frequency fr2 by less than 1% of the resonant frequency fr2 and/or by less than 1 Hz and/or to provide the wanted-electrical current component eN2 of the driver signal e2 with an (alternating electrical current) frequency, which differs from the above described resonant frequency fr1 by less than 1% of the resonant frequency fr1 and/or by less than 1 Hz; this, for example, also in such a manner that, in the second operating mode of the measuring system electronics 20, the mechanical oscillations of the tube 112 coupled with the first wanted oscillations of the tube 111 correspond to resonant oscillations of the tube 112, and the mechanical oscillations of the tubes 112, 114 coupled with the first wanted oscillations of the tubes 111, 113 correspond to resonant oscillations of the tubes 112, 114.

For the purpose of detecting a possible disturbance of the measuring system, the measuring system electronics 20 in an additional embodiment of the invention is, furthermore, adapted, based on one or more of the oscillation measurement signals received in the second operating mode, at least at times, especially recurringly, to calculate one or more values of at least one measuring system characterizing number MK1, which characterizes the above described operating state of the measuring transducer, or the measuring system formed therewith; this, especially, in such a manner that the measuring system characterizing number K1 is dependent on one or more parameters of a system function of the measuring system mediating between the wanted electrical current eN1 of the driver signal e1 and the coupling signal component sK3 of the oscillation measurement signal s3 and/or the coupling signal component sK4 of the oscillation measurement signal s4, or a temporal change of one or more of the above described parameters. The measuring system characterizing number MK1 can depend, for example, on a system-amplitude ratio between the wanted electrical current eN1 of the driver signal e1 and the coupling signal component sK3, or sK4, of at least one of the oscillation measurement signals s3, s4, for example, a sum sK3+sK4 of the coupling signal components of the oscillation measurement signals s3, s4, or on a change of the system amplitude ratio, and can correspondingly evaluate and/or quantify the system-amplitude ratio (s3+s4)/e1 or a change thereof. Alternatively or supplementally, the measuring system characterizing number K1 can also depend on a system-phase difference between the wanted signal component sN1, sN2 of at least one of the oscillation measurement signals s1, s2, for example, a sum sN1+sN2 of the wanted signal components sN1, sN2 of the oscillation measurement signals s1, s2, and the coupling signal component sK3, sK4 of at least one of the oscillation measurement signals s3, s4, for example, a sum sK3+sK4 of the coupling signal components sk3, sK4 of the oscillation measurement signals s3, s4, or on a change of the system-phase difference, and can evaluate and/or quantify the system-phase difference or a change thereof.

For detecting the presence of a disturbance degrading the ability of the measuring transducer to function, and, consequently, degrading the accuracy of measurement of the measuring system, the measuring system electronics 20 in an additional embodiment of the invention is, furthermore, adapted to evaluate one or more values for the at least one measuring system characterizing number MK1, for example, in each case, to compare such with one or more reference values RK1$_1$ (RK1$_1$, RK1$_2$ . . . RK1$_i$, . . . ) earlier ascertained for the measuring system characterizing number MK1, for example, reference values stored in the aforementioned non-volatile electronic data memory EEPROM. Accordingly, the measuring system electronics 20 is, furthermore, also adapted to ascertain, whether one or more values for the measuring system characterizing number MK1 is greater than one or more such reference values for the measuring system characterizing number MK1 representing, for example, a no longer intact measuring system and, in given cases, for example, also to output the (disturbance) report signaling such, for example, to display such on-site and/or to transmit such report to the above-mentioned electronic data processing system as a status. The reference values for the measuring system characterizing number MK1 can be, for example, reference values representing a lessened ability of the measuring transducer to function (attributable to one of the above described disturbances), or a malfunctioning of the measuring transducer (attributable to one of the above described disturbances). The reference values can be ascertained, for example, earlier, for example, by the manufacturer of the measuring system, for instance in a (plant) calibration completed during production of the measuring system and/or during the start-up on-site, and/or during operation of the measuring system; this, for example, in such a manner that, firstly, the particular measuring system characterizing number MK1 for the readied, consequently intact, measuring system is ascertained and with a tolerance value corresponding to a still tolerable influencing correspondingly converted into the reference value RK1$_1$ and stored in the data memory EEPROM.

The ascertaining of the values MK1 and the ascertaining of the presence of a disturbance of the measuring system can, such as already indicated, also be initiated, or ceased, automatically, for example, as a function of time and/or also as a function of changes of other diagnostic values. Alternatively or supplementally, the ascertaining of the values can, however, also be initiated and/or ceased externally of the measuring system, for example, starting from the aforementioned electronic data processing system via the transmitting- and receiving circuit COM and/or starting from operating personnel on-site via the display- and interaction element HMI. Accordingly, the measuring system electronics 20 is in an additional embodiment adapted to receive and to evaluate a start-command initiating at least the ascertaining of values at least for the characterizing number MK1, in given cases, also its above-mentioned evaluation, namely to detect an input of the start-command and then to set in motion the ascertaining of values for the first measuring system characterizing number MK1 and/or the measuring system electronics is adapted to receive and to evaluate a stop-command suppressing, at least temporarily, the ascertaining of the values for the measuring system characterizing number MK1, namely to detect input of the stop-command and then, at least temporarily, to stop ascertaining values for the measuring system characterizing number MK1.

For further improving the accuracy, and reliability, with which measured values and/or the occurrence of a disturbance are ascertained during operation, the measuring system electronics 20 is in an additional embodiment of the invention, furthermore, adapted to produce the driver signal e2 with the wanted electrical current eN2 at least temporarily in a third operating mode, for example, activated after the second operating mode and/or alternately therewith, and to supply such to the oscillation exciter 32, for example, to supply electrical current to the oscillation exciter 32 as in the first operating mode and at the same time to supply no driver signal containing the wanted-electrical current component eN1 to the first oscillation exciter, in such a manner that the tube 112 executes, at least partially, second wanted oscillations and the tube 111 correspondingly executes mechanical oscillations coupled with the second wanted oscillations and having the wanted frequency fN2, equally as well, executing no first wanted oscillations, and that, as a result, oscillation signals s3, s4 have the wanted signal components sN3 and sN4, respectively, and oscillation signals s1, s2, have coupling signal components sK1, sK2, respectively, namely sinusoidal signal components having a frequency corresponding to the (alternating electrical current) frequency of the wanted electrical current eN2. Additionally, the measuring system electronics 20 can, furthermore, be adapted in the third operating mode to receive and to evaluate at least the oscillatory signal s1 and/or the oscillatory signal s2, for example, also the oscillatory signal s3 and/or the oscillatory signal s4, for example, (analogously to the second operating mode) to ascertain measured values for the at least one measured variable and/or to ascertain whether a disturbance ε of the measuring system is present.

The invention claimed is:

1. A vibronic measuring system, for measuring and/or monitoring at least one time variable flow parameter, including a mass flow, a volume flow, and/or a flow velocity, and/or for measuring and/or monitoring at least one time variable, substance parameter of a flowing measured substance, the vibronic measuring system comprising:

a measuring transducer including a tube arrangement for conveying the flowing measured substance, an exciter arrangement for converting electrical power into mechanical power serving for exciting and maintaining forced mechanical oscillations of the tube arrangement, and a sensor arrangement for registering mechanical oscillations of the tube arrangement and for providing oscillation measurement signals representing oscillatory movements of the tube arrangement; and a measuring system electronics electrically coupled with the measuring transducer, namely both with its exciter arrangement and with its sensor arrangement, wherein the measuring system electronics is configured to operate the measuring transducer and to evaluate oscillation measurement signals delivered from the measuring transducer, wherein the tube arrangement includes a first flow divider with at least two flow openings, a second flow divider with at least two flow openings, a first tube, and at least a second tube, wherein each of the first and second tubes of the tube arrangement extends, in each case, from a first end of the tube to a second end of the tube with a tube length and has, in each case, a lumen surrounded by a tube wall, and extending, in each case, from the first end of the tube to the second end of the tube, wherein each of the first and second tubes of the tube arrangement is connected, in each case, to each of the first and second flow dividers, in such a manner that the first tube communicates with its first end with a first flow opening of the first flow divider and with its second end with a first flow opening of the second flow divider, and the second tube communicates with its first end with a second flow opening of the first flow divider and with its second end with a second flow opening of the second flow divider, wherein the first and second tubes of the tube arrangement are mechanically coupled with one another at least via the first and second flow dividers in such a manner that forced mechanical oscillations of the first tube bring about coupled mechanical oscillations of the second tube and forced mechanical oscillations of the second tube bring about coupled mechanical oscillations of the first tube, wherein each of the first and second tubes of the tube arrangement, in each case, is adapted to be flowed through by measured substance and during that to be caused to vibrate, wherein the exciter arrangement includes oscillation exciters of which a first oscillation exciter is mechanically connected with the first tube and a second oscillation exciter is mechanically connected with the second tube, wherein each of the first and second oscillation exciters is, in each case, adapted to convert electrical power of a time variable electrical current into mechanical power, wherein the sensor arrangement includes at least four oscillation sensors of which a first oscillation sensor and a second oscillation sensor are mutually spaced and positioned on the first tube, and a third oscillation sensor and a fourth oscillation sensor are mutually spaced and positioned on the second tube, wherein each of the first and second oscillation sensors is, in each case, adapted to register oscillatory movements of the first tube and to convert such into first and second oscillation measurement signals representing the oscillatory movements of the first tube, wherein each of the third and fourth oscillation sensors is, in each case, adapted to register oscillatory movements of the second tube and to convert such into third and fourth oscillation measurement signals representing the oscillatory movements of the second tube, wherein the measuring system electronics is adapted to supply electrical current to the first oscillation exciter, namely to supply an electrical, first driver signal to the first oscillation exciter, whereby the first tube executes forced mechanical oscillations with one or more oscillation frequencies predetermined by the first driver signal, and the second tube executes mechanical oscillations coupled with at least one of the oscillations of the first tube, and to supply electrical current to the second oscillation exciter, namely to supply an electrical, second driver signal to the second oscillation exciter, whereby the second tube executes forced mechanical oscillations with one or more oscillation frequencies predetermined by the second driver signal, and the first tube executes mechanical oscillations coupled with oscillations of the second tube, wherein the measuring system electronics is adapted: in a first operating mode to produce both the first driver signal with a first wanted electrical current, namely an electrical current level dominating or single, sinusoidal electrical current component having an alternating electrical current frequency, and to supply such to the first oscillation exciter and to produce the second driver signal with at least a second wanted electrical current, namely an electrical current level dominating or single, sinusoidal electrical current component having an alternating electrical current frequency, and to supply such to the second oscillation exciter such that the first tube executes at least partially first wanted oscillations, namely mechanical oscillations forced by the electrical current supplied first oscillation exciter and having at least a first wanted frequency, namely an oscillation frequency corresponding to the alternating electrical current frequency of the first wanted electrical current and the second tube executes at least partially second wanted oscillations, namely mechanical oscillations forced by the electrical current supplied second oscillation exciter and having at least a second wanted frequency, namely an oscillation frequency corresponding to the alternating electrical current frequency of the second wanted electrical current and each of the first and second oscillation signals includes first and second wanted signal components, respectively, namely sinusoidal signal components with frequency corresponding to the first wanted frequency and each of the third and fourth oscillation signals includes third and fourth wanted signal components, namely sinusoidal signal components with frequency corresponding to the second wanted frequency; and in a second operating mode, at least temporarily, to produce the first driver signal with the first wanted electrical current and to supply such to the first oscillation exciter, and, at the same time, to supply no driver signal containing the second wanted electrical current component to the second oscillation exciter such that, the first tube executes, at least partially, first wanted oscillations and the second tube executes mechanical oscillations coupled with the first wanted oscillations and having the first wanted frequency, and, equally as well, no second wanted oscillations, and each of the first and second oscillation signals includes, in each case, the wanted signal component and each of the third and fourth oscillation signals includes, in each case, a coupling signal component, namely a particular sinusoidal signal component having frequency corresponding to the alternating electrical current frequency of the first wanted electrical current, and wherein the measuring system electronics is adapted: in the first operating mode to receive and to evaluate the first, second, third and fourth oscillation signals, namely based on the oscillation signals, to ascertain measured values quantifying at least one physical, measured variable, and in the second operating mode, to receive and to evaluate at least the third oscillation signal and/or the fourth oscillation signal.

2. The measuring system as claimed in claim 1, wherein the measuring system electronics is adapted in the second operating mode also to receive and to evaluate the first oscillation signal and/or the second oscillation signal.

3. The measuring system as claimed in claim 1, wherein the measuring system electronics is adapted, based on at least one of the third and fourth oscillation signals received in the second operating mode to ascertain measured values quantifying the at least one physical, measured variable sequentially in time and also to compare such measured values with measured values ascertained for the measured variable based on oscillation signals received in the first operating mode.

4. The measuring system as claimed in claim 1, wherein the measuring system electronics is adapted to win or ascertain one or more wanted signal components both from at least one of the first and second oscillation signals received in the first operating mode as well as also in the second operating mode, as well as also to win or ascertain one or more wanted signal components from at least one of the third and fourth oscillation signals received in the first operating mode.

5. The measuring system as claimed in claim 1, wherein each of the wanted signal components of the first, second, third and fourth oscillation signals has a phase angle dependent on mass flow of the measured substance.

6. The measuring system as claimed in claim 5, wherein the measuring system electronics is adapted to ascertain and to calculate mass flow measured values, namely mass flow measured values representing the mass flow of the flowing measured substance at least in the first operating mode based on a first phase difference, namely a difference between the phase angle of the wanted signal component of the first oscillation signal and the phase angle of the wanted component of the second oscillation signal as well as based on a second phase difference, namely a difference between the phase angle of the wanted signal component of the third oscillation signal and the phase angle of the wanted signal component of the fourth oscillation signal.

7. The measuring system as claimed in claim 1, wherein the measuring system electronics is adapted to win or ascertain one or more coupling signal components from at least one of the third and fourth oscillation signals received in the second operating mode.

8. The measuring system as claimed in claim 1, wherein each of the coupling signal components of the third and fourth oscillation signals has a phase angle dependent on mass flow of the measured substance.

9. The measuring system as claimed in claim 8, wherein the measuring system electronics is adapted at least in the second operating mode to ascertain and to calculate mass flow measured values based on the first phase difference and based on a third phase difference, namely a difference between the phase angle of the coupling signal component of the third oscillation signal and the phase angle of the coupling signal component of the fourth oscillation signal, and/or to compare mass flow measured values ascertained based on the first and second phase differences.

10. The measuring system as claimed in claim 9, wherein the measuring system electronics is adapted to compare the first phase difference and the third phase difference with one another, and in the case of a too large difference, namely a difference exceeding a predetermined reference value, to output a report including a disturbance alarm.

11. The measuring system as claimed in claim 1, wherein the measuring system electronics is adapted based on at least one of the third and fourth oscillation signals received in the second operating mode to detect, whether a disturbance of the measuring system is present, including a disturbance lessening an ability of the measuring system to function and/or bringing about a malfunctioning of the measuring system and/or reducing an integrity of at least one of the first, second, third and fourth oscillation measurement signals, or measured values won therefrom and/or provoking measurement errors of measured values won therefrom, including a disturbance due to a deposit on an inside of the tube wall of one or more of the tubes and/or due to a reduced thickness of the tube wall of one or more of the tubes and/or due to an aging of one or more of the oscillation sensors and/or oscillation exciters, including detection by a comparison of measured values for the at least one measured variable ascertained based on oscillation signals received in the first operating mode with measured values for the measured variable ascertained based on oscillation signals received in the second operating mode.

12. The measuring system as claimed in claim 11,
   wherein the disturbance of the measuring system comprises an irreversible change of one or more oscillation characteristics of the tube arrangement due to a reduced thickness of the tube wall of one or more of the tubes and/or due to a plastic deformation of one or more of the tubes and/or due to a deposit on an inside of the tube wall of one or more of the tubes and/or due to a crack in the tube wall of one or more of the tubes; and/or
   wherein the disturbance of the measuring system comprises an irreversible change of one wherein the disturbance of the measuring system comprises an irreversible change of one or more flow characteristics of the tube arrangement due to a reduced flow cross section of the tube arrangement as a result of a plugging of one or more of the tubes and/or as a result of a deposit on an inside of the tube wall of one or more of the tubes; and/or
   wherein the disturbance of the measuring system comprises an irreversible change of one wherein the disturbance of the measuring system comprises an irreversible change of one or more electromechanical transducer characteristics due to an aging of one or more of the oscillation sensors and/or oscillation exciters and/or due to a change of a mechanical connection between one or more oscillation sensors, or one or more oscillation exciters and their tube or tubes.

13. The measuring system as claimed in claim 11, wherein the disturbance of the measuring system includes an irreversible change of a scale zero point of the measuring system that corresponds to a first and/or second phase difference measured at resting measured substance, and/or a measuring sensitivity of the measuring system that corresponds to a change of the first and/or second phase difference based on a change of the mass flow.

14. The measuring system as claimed in claim 11, wherein the measuring system electronics is adapted, based on one or more of the oscillation measurement signals received in the second operating mode, to calculate one or more values of at least one measuring system characterizing number that characterizes an operating state, including a system transfer function inherent in the measuring system and determining one or more functional dependencies of one or more of the oscillation measurement signals on one or more of the driver signals, and determining an ability of the measuring system to function in such a manner that the measuring system characterizing number is dependent on one or more parameters of a system function of the measuring system mediating between the first wanted electrical current of the first driver signal and the coupling signal component of the third and/or fourth oscillation measurement signal.

15. The measuring system as claimed in claim 14, wherein the measuring system characterizing number is dependent on a system amplitude ratio between the first wanted electrical current of the first driver signal and the coupling signal component of at least one of the third and fourth oscillation measurement signals, including a sum of the coupling signal components of the third and fourth oscillation measurement signals, and the measuring system characterizing number quantifies the system amplitude ratio $(s3+s4)/e1$, wherein $s3$ is the third oscillation measurement signal, $s4$ is the fourth oscillation measurement signal, and $e1$ is the first driver signal.

16. The measuring system as claimed in claim 14, wherein the measuring system characterizing number is dependent on a system phase difference between the wanted signal component of at least one of the first and second oscillation measurement signals, including a sum of the wanted signal components of the first and second oscillation measurement signals, and the coupling signal component of at least one of the third and fourth oscillation measurement signals, including a sum of the coupling signal components of the third and fourth oscillation measurement signals, and the measuring system characterizing number quantifies the system phase difference.

17. The measuring system as claimed in one of claim 16, wherein the measuring system electronics is adapted to compare one or more values for the measuring system characterizing number, in each case, with one or more reference values for the measuring system characterizing number, one or more reference values ascertained by the manufacturer of the measuring system and/or during manufacture and/or a start-up of the measuring system, one or more reference values representing a lessened ability of the measuring transducer to function and/or one or more reference values representing a malfunctioning of the measuring transducer and/or one or more reference values representing a defective measuring transducer, and to evaluate and/or to quantify a deviation of one or more of the characterizing number values from one or more of the reference values.

18. The measuring system as claimed in claim 17, wherein the measuring system electronics is adapted to ascertain whether one or more values for the measuring system characterizing number is greater than the at least one reference value for the measuring system characterizing number in case one or more values for the measuring system characterizing number is greater than one or more reference values representing a lessened ability of the measuring transducer to function and/or greater than one or more reference values representing a malfunctioning of the measuring transducer and/or greater than one or more reference values representing a no longer intact measuring transducer, to output report a signaling such in the form of a disturbance alarm.

19. The measuring system as claimed in claim 18, wherein the measuring system electronics includes a non-volatile electronic data memory adapted to provide digital data without an applied operating voltage and to store one or more earlier ascertained, reference values for the measuring system characterizing number.

20. The measuring system as claimed in claim 19, wherein there are stored in the electronic data memory one or more reference values for the measuring system characterizing number, including values earlier ascertained by the manufacturer of the measuring system and/or in the production of the measuring system and/or during operation of the measuring system, including one or more reference values representing a lessened ability of the measuring transducer to function and/or namely one or more reference values representing a malfunctioning of the measuring transducer.

21. The measuring system as claimed in claim 20, wherein the measuring system electronics is adapted to compare one or more values for the measuring system characterizing number, in each case, with one or more reference values for the measuring system characterizing number stored in the data memory.

22. The measuring system as claimed in claim 1, wherein the measuring system electronics is adapted to provide the first wanted electrical current component of the first driver signal with an alternating electrical current frequency that differs from a resonant frequency of the first tube by less than 1% of the resonant frequency and/or by less than 1 Hz.

23. The measuring system as claimed in claim 1, wherein the measuring system electronics is adapted to provide the second wanted electrical current component of the second driver signal with an alternating electrical current frequency that differs from a resonant frequency of the second tube by less than 1% of the resonant frequency and/or by less than 1 Hz.

24. The measuring system as claimed in claim 1, wherein the measuring system electronics is adapted to provide the wanted electrical current component of the first driver signal with an alternating electrical current frequency that differs from a resonant frequency of the second tube by less than 1% of the resonant frequency and/or by less than 1 Hz.

25. The measuring system as claimed in claim 1, wherein the measuring system electronics is adapted to provide the second wanted electrical current component of the second driver signal with an alternating electrical current frequency that differs from a resonant frequency of the first tube by less than 1% of the resonant frequency and/or by less than 1 Hz.

26. The measuring system as claimed in claim 1, wherein the first and second tubes have at least one common resonant frequency and wherein the measuring system electronics is adapted to provide the first and second wanted electrical current components of the first and second driver signals, in each case, with an alternating electrical current frequency, which differs from the common resonant frequency of the first and second tubes by less than 1% of the common resonant frequency and/or by less than 1 Hz in such a manner that a phase difference of 180° is set between the first and second wanted electrical currents.

27. The measuring system as claimed in claim 1, wherein the measuring transducer has a natural bending oscillation mode in the case of which the first and second tubes can execute opposite phase, mechanical oscillations, and wherein the measuring system electronics is adapted in the first operating mode to supply the first and second oscillation exciters first and second driver signals forcing opposite phase, mechanical oscillations, and to supply the first and second wanted electrical currents with an alternating electrical current frequency, which differs from a resonant frequency of the bending oscillation mode by less than 1% of the resonant frequency and/or by less than 1 Hz.

28. The measuring system as claimed in claim 1, further comprising a support structure embodied as a transducer protective housing, wherein support structure and tube arrangement are releasably secured with one another by the first and second flow dividers.

29. The measuring system as claimed in claim 28, wherein the first and second oscillation exciters are mechanically connected with the support structure; and/or wherein the first, second, third and fourth oscillation sensors are mechanically connected with the support structure.

30. The measuring system as claimed in claim 28, wherein both the first flow divider as well as also the second flow divider include, in each case four flow openings,
wherein the tube arrangement includes a third tube at least sectionally bent and/or at least sectionally straight and/or at least sectionally parallel to the first tube, and a fourth tube at least sectionally bent and/or at least sectionally straight and/or constructed equally to the third tube and/or at least sectionally parallel to the third tube,
wherein each of the third and fourth tubes of the tube arrangement extends, in each case, from a first end of the tube to a second end of the tube with a tube length and, in each case, includes a lumen surrounded by a metal tube wall, and extending, in each case, from the first end of the tube to the second end of the tube,
wherein each of the third and fourth tubes of the tube arrangement is connected, in each case, to each of the first and second flow dividers, in such a manner that the third tube communicates with its first end with a third flow opening of the first flow divider and with its second end with a third flow opening of the second flow divider, and the fourth tube communicates with its first end with a fourth flow opening of the first flow divider and with its second end with a fourth flow opening of the second flow divider, and
wherein each of the third and fourth tubes of the tube arrangement is adapted, in each case, to be flowed through by measured substance and during that to be caused to vibrate.

31. The measuring system as claimed in claim 30, wherein the third and fourth tubes of the tube arrangement are mechanically coupled with one another at least via the first and second flow dividers, in such a manner that:
forced mechanical oscillations of the third tube bring about coupled mechanical oscillations of the fourth tube and forced mechanical oscillations of the fourth tube bring about coupled mechanical oscillations of the third tube; and/or
forced mechanical oscillations of the first and third tubes, including opposite-equal bending oscillations of the first and third tubes, bring about coupled mechanical oscillations of each of the second and fourth tubes, including opposite-equal bending oscillations of the second and fourth tubes, and forced mechanical oscillations of the second and fourth tubes, including opposite-equal bending oscillations of the second and fourth tubes, bring about coupled mechanical oscillations of each of the first and third tubes, including opposite-equal bending oscillations of the first and third tubes; and/or
forced mechanical oscillations of each of the first, second, third and fourth tubes, in each case, bring about coupled mechanical oscillations of each of the other first, second, third, and fourth tubes.

32. The measuring system as claimed in claim 31,
wherein the first oscillation exciter is adapted to excite mechanical oscillations of the first and third tubes; and
wherein the second oscillation exciter is adapted to excite mechanical oscillations of the second and fourth tubes.

33. The measuring system as claimed in claim 32,
wherein the first oscillation exciter is connected mechanically both with the first tube as well as also with the third tube, and
wherein the second oscillation exciter is connected mechanically both with the second tube as well as also with the fourth tube.

34. The measuring system as claimed in claim 33,
wherein each of the first and second oscillation sensors is, in each case, adapted to register differentially oscillatory movements of the first and third tubes, in such a manner that each of the first and second oscillation measurement signals represents opposite phase oscillatory movements of the first and third tubes; and
wherein each of the third and fourth oscillation sensors is, in each case, adapted to register differentially oscillatory movements of the second and fourth tubes, in such a manner that each of the third and fourth oscillation measurement signals represents opposite phase oscillatory movements of the second and fourth tubes.

35. The measuring system as claimed in claim 34,
wherein the first and second oscillation sensors are connected mechanically, in each case, both with the first tube as well as also with the third tube; and
wherein the third and fourth oscillation sensors are connected mechanically, in each case, both with the second tube as well as also with the fourth tube.

36. The measuring system as claimed in claim 35,
wherein the first, second, third and fourth tubes are only pairwise of equal construction in such a manner that the first tube is only of equal construction to the third tube and the second tube is only of equal construction to the fourth tube; and/or
wherein each of the four tubes has a caliber, which equals a caliber of each of the other tubes; and/or
wherein the tube wall of each of the four tubes has a thickness, which equals a thickness of each of the other tubes.

37. The measuring system as claimed in claim 1, wherein the tube arrangement has a plate shaped first coupling element mechanically connected with each of the tubes and positioned farther removed from the second flow divider than from the first flow divider, and a plate shaped second coupling element mechanically connected with each of the tubes and positioned farther removed from the first flow divider than from the second flow divider and constructed equally to the first coupling element.

38. The measuring system as claimed in claim 1, further comprising:
an electronics protective housing for the measuring system electronics,
wherein the electronics protective housing is secured to a support structure of the measuring transducer.

39. The measuring system as claimed in claim 1,
wherein the measuring system electronics is adapted in a third operating mode, activated following the second operating mode:
at least temporarily to produce the second driver signal with the second wanted electrical current and to supply such to the second oscillation exciter, and to supply electrical current to the second oscillation exciter as in the first operating mode, and at the same time to supply no driver signal containing the first wanted electrical current component to the first oscillation exciter, in such a manner that, the second tube executes, at least partially, second wanted oscillations and the first tube executes mechanical oscillations coupled with the second wanted oscillations and having the second wanted frequency, while, equally as well, executing no first wanted oscillations, and each of the third and fourth oscillation signals has, in each case, the wanted signal component and each of the first and second oscillation signals has, in each case, a coupling signal component, namely a sinusoidal signal component having a frequency corresponding to the alternating electrical current frequency of the second wanted electrical current; and
wherein the measuring system electronics is adapted in the third operating mode to receive and to evaluate at least the first oscillation signal and/or the second oscillation signal or both the first oscillation signal as well as also the second oscillation signal, and to receive and to evaluate the first, second, third and fourth oscillation signals.

* * * * *